United States Patent
Kobayashi et al.

(10) Patent No.: US 7,012,389 B2
(45) Date of Patent: Mar. 14, 2006

(54) ELECTRIC DRIVE CONTROL APPARATUS, ELECTRIC DRIVE CONTROL METHOD AND PROGRAM THEREOF

(75) Inventors: Yasuhiko Kobayashi, Anjo (JP); Yasuo Yamaguchi, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 10/920,160

(22) Filed: Aug. 18, 2004

(65) Prior Publication Data
US 2005/0046369 A1    Mar. 3, 2005

(30) Foreign Application Priority Data
Aug. 25, 2003    (JP)    ............................... 2003-208581

(51) Int. Cl.
*H02P 6/08*    (2006.01)

(52) U.S. Cl. .................. 318/254; 318/430; 318/433

(58) Field of Classification Search ............... 318/138, 318/254, 430–434, 439, 720–724
See application file for complete search history.

(56) References Cited

U.S. PATENT DOCUMENTS

| | | | | |
|---|---|---|---|---|
| 5,623,192 A | * | 4/1997 | Yamamoto | 318/811 |
| 5,877,603 A | * | 3/1999 | Uchida et al. | 318/434 |
| 6,184,648 B1 | * | 2/2001 | Kato et al. | 318/811 |
| 6,605,912 B1 | * | 8/2003 | Bharadwaj et al. | 318/439 |
| 6,639,379 B1 | * | 10/2003 | Matsushita et al. | 318/727 |

FOREIGN PATENT DOCUMENTS

JP    A 5-130710    5/1993

* cited by examiner

*Primary Examiner*—Bentsu Ro
(74) *Attorney, Agent, or Firm*—Oliff & Berridge, PLC

(57) ABSTRACT

An electric drive control apparatus for an electric machine, includes a controller that computes an instruction value based on an electric machine rotational speed and a target electric machine torque that represents a target value of an electric machine torque, generates a drive signal based on the instruction value, computes a voltage saturation variable that represents a likelihood of an occurrence of a voltage saturation, determines whether a switch condition for switching a control between an asynchronous PWM control and a synchronous PWM control is met based on the voltage saturation variable, and selects and outputs the drive signal and switches the control between the asynchronous PWM control and the synchronous PWM control based on a determination as to the switch condition.

24 Claims, 13 Drawing Sheets

ELECTRIC DRIVE CONTROL APPARATUS, ELECTRIC DRIVE CONTROL METHOD AND PROGRAM THEREOF

INCORPORATION BY REFERENCE

The disclosure of Japanese Patent Application No. 2003-208581 filed on Aug. 25, 2003, including the specification, drawings and abstract, is incorporated herein by reference in its entirety.

BACKGROUND OF THE INVENTION

1. Field of Invention

The invention relates to an electric drive control apparatus, an electric drive control method, and a program thereof.

2. Description of Related Art

There exists an electric drive apparatus that is mounted in a vehicle. For example, an electric motor vehicle as a type of electric vehicle. The electric drive apparatus causes the generation of a drive motor torque of a drive motor that acts as an electric machine. The drive motor torque is transferred to driving wheels so as to generate a driving force.

An electric drive apparatus is also mounted in a hybrid type vehicle, that is, an electric vehicle. The electric drive apparatus transfers a portion of an engine torque of an internal combustion engine, to an electric power generator (generator-motor) that acts as a first electric machine, and transfers the rest of the engine torque to the driving wheels. The electric drive apparatus has a planetary gear unit that includes a sun gear, a ring gear and a carrier. The carrier and the engine are connected, and the ring gear and the driving wheels are connected, and the sun gear and the generator are connected. Rotation output from the ring gear and a drive motor that acts as a second electric machine is transferred to the driving wheels to generate a driving force.

In the generator and the drive motor, a rotor is rotatably disposed and has a magnetic pole pair formed by a permanent magnet having a north pole and a south pole. Furthermore, a stator is disposed radially outward of the rotor, and is equipped with U-phase, V-phase and W-phase stator coils.

The aforementioned electric vehicle is provided with a drive motor control apparatus and the aforementioned hybrid type vehicle is provided with a generator control apparatus and a drive motor control apparatus as electric machine control apparatuses. Pulse width modulation signals of the U phase, the V phase and the W phase generated by the generator control apparatus and the drive motor control apparatus are sent to an inverter. The inverter generates phase electric currents, that is, currents of the U phase, the V phase and the W phase. The phase currents are then supplied to the stator coils so as to perform an asynchronous PWM control, whereby the drive motor is driven to generate drive motor torque or the generator is driven to generate generator torque.

In the drive motor control apparatus, for example, a feedback control based on a vector control computation is executed on a d-q axes model. In this model, the d axis is defined in a direction of the magnetic pole pair of the rotor and the q axis is defined in a direction perpendicular to the d axis. To that end, the drive motor control apparatus detects the electric current supplied to each stator coil, the magnetic pole position of the rotor, and the DC voltage at an input side of the inverter, for example. The apparatus then converts the detected currents into a d-axis current and a q-axis current on the basis of the magnetic pole position, and computes a d-axis current instruction value and a q-axis current instruction value that indicate a target value of the d-axis current and a target value of the q-axis current on the basis of the DC voltage. The drive motor control apparatus operates so that a deviation between the d-axis current and the d-axis current instruction value and a deviation between the q-axis current and the q-axis current instruction value become zero (see, for example, Japanese Patent Application Laid-Open Publication No. HEI 5-130710).

SUMMARY OF THE INVENTION

However, in the drive motor control apparatus, an unattainable d-axis current instruction value or an unattainable q-axis current instruction value may be set if there exists a detection error regarding a sensor. The detection error may exist with a current sensor for detecting the aforementioned electric current, a magnetic pole position sensor for detecting the magnetic pole position or a voltage sensor for detecting the DC voltage. The detection error may also exist, if, in conjunction with a change in temperature, a change occurs in a machine constant, such as the counter electromotive voltage constant Mif of the drive motor, the inductances Ld, Lq of the stator coils or the resistance Ra of the stator coils.

As a result, voltage saturation occurs, and a drift or deviation occurs between a target drive motor torque TM* and an actually generated drive motor torque TM. Consequently, as the vehicle runs, a driver may feel uncomfortable or the driving of the drive motor may become difficult.

In order to prevent the occurrence of the voltage saturation, it is conceivable to correct, for example, the electrical angular speed as a control variable. However, due to the execution of the asynchronous PWM control, vibrations occur on the drive motor in a high-rotation speed region in which the drive motor is operated at a high speed. As a result, the drive motor cannot be smoothly driven.

The invention thus provides, among other things, an electric drive control apparatus, an electric drive control method and a program thereof which are capable of solving the aforementioned problems of the related-art drive motor control apparatus and smoothly drive an electric machine.

An electric drive control apparatus for an electric machine in accordance with an exemplary aspect of the invention includes a controller that computes an instruction value based on an electric machine rotational speed and a target electric machine torque that represents a target value of an electric machine torque, generates a drive signal based on the instruction value, computes a voltage saturation variable that represents a likelihood of an occurrence of a voltage saturation, determines whether a switch condition for switching a control between an asynchronous PWM control and a synchronous PWM control is met based on the voltage saturation variable, and selects and outputs the drive signal and switches the control between the asynchronous PWM control and the synchronous PWM control based on a determination as to the switch condition.

An electric drive control method in accordance with another exemplary aspect of the invention includes the steps of computing an instruction value based on an electric machine rotational speed and a target electric machine torque that represents a target value of an electric machine torque, generating a drive signal based on the instruction value, computing a voltage saturation variable that represents a likelihood of an occurrence of a voltage saturation, determining whether a switch condition for switching a control between an asynchronous PWM control and a synchronous PWM control is met based on the voltage saturation variable, and selecting and outputting the drive signal and switching the control between the asynchronous PWM control and the synchronous PWM control based on a result of a determination as to the switch condition.

The program of an electric drive control device in accordance with another exemplary aspect of the invention includes a routine that computes an instruction value based on an electric machine rotational speed and a target electric machine torque that represents a target value of an electric machine torque, a routine that generates a drive signal based on the instruction value, a routine that computes a voltage saturation variable that represents a likelihood of an occurrence of a voltage saturation, a routine that determines whether a switch condition for switching a control between an asynchronous PWM control and a synchronous PWM control is met based on the voltage saturation variable, and a routine that selects and outputs the drive signal and switches the control between the asynchronous PWM control and the synchronous PWM control based on a determination as to the switch condition.

BRIEF DESCRIPTION OF THE DRAWINGS

Various embodiments of the invention will be described with references to the drawings, wherein.

DETAILED DESCRIPTION OF PREFERRED EMBODIMENTS

Embodiments of the invention will be described in detail hereinafter with reference to the accompanying drawings. Although embodiments of the invention will be described below in conjunction with, for example, an electric motor vehicle as a type of electric vehicle, the invention may also be applied to a hybrid type vehicle.

Figure 1:
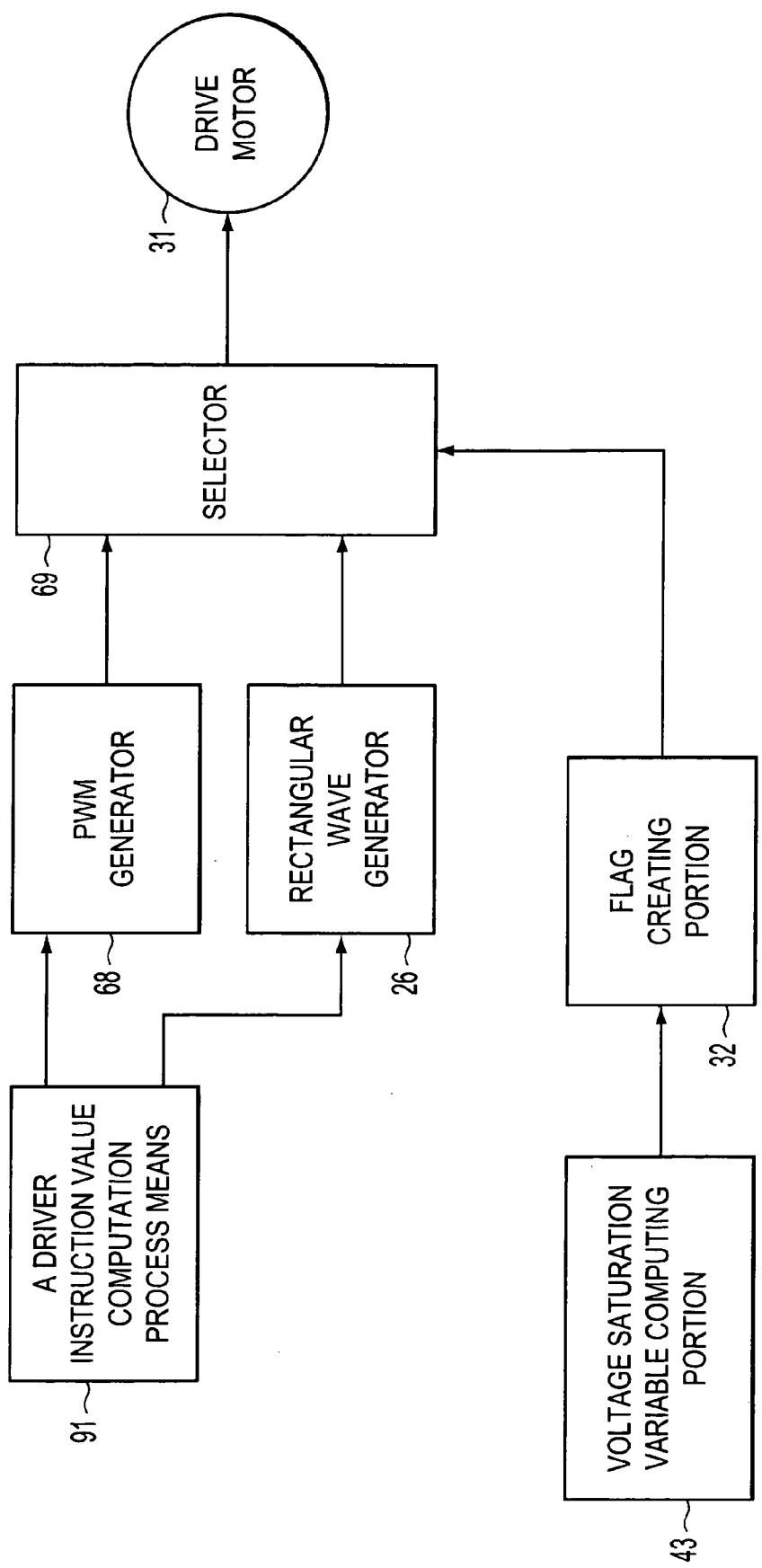
FIG. 1 is a function block diagram of an electric drive control apparatus in accordance with an embodiment of the invention.

FIG. 1 is a function block diagram of an electric drive control apparatus in accordance with an embodiment of the invention. In FIG. 1, reference numeral 31 denotes a drive motor; and reference numeral 91 denotes an instruction value computation process means for computing instruction values (a d-axis current instruction value and a q-axis current instruction value) on the basis of an electric machine rotation speed (rotation speed of the drive motor 31, i.e., drive motor rotation speed) and a target electric machine torque (target drive motor torque) that represents a target value of the electric machine torque (drive motor torque). Reference numerals 68, 26 denote a PWM generator and a rectangular wave generator, respectively, as a plurality of signal generation process means for generating drive signals (a pulse width modulation signal and a rectangular wave signal) on the basis of the instruction values, that is, first and second signal generation process means in this embodiment. Reference numeral 43 denotes a voltage saturation variable calculating portion as a voltage saturation variable computation process means for computing a voltage saturation variable that indicates the likelihood of occurrence of voltage saturation. Further, reference numeral 32 denotes a flag creating portion as a control switch determination process means for determining whether a switch condition for switching the control between an asynchronous PWM control and a synchronous PWM control is met on the basis of the voltage saturation variable, finally reference numeral 69 denotes a selector as a control switch process means for selecting and outputting the drive signal and switching the control between the asynchronous PWM control and the synchronous PWM control on the basis of a result of determination carried out by the flag creating portion 32.

For the purposes of this disclosure, the means discussed above may be considered operations that are performed by a controller. Further, in some cases as defined in the specification, the means may include other elements. Alternatively, in some cases as defined below in the specification, device and means may be considered synonyms.

Next, an electric drive control apparatus mounted in an electric motor vehicle will be described with reference to the accompanying drawings.

Figure 2:
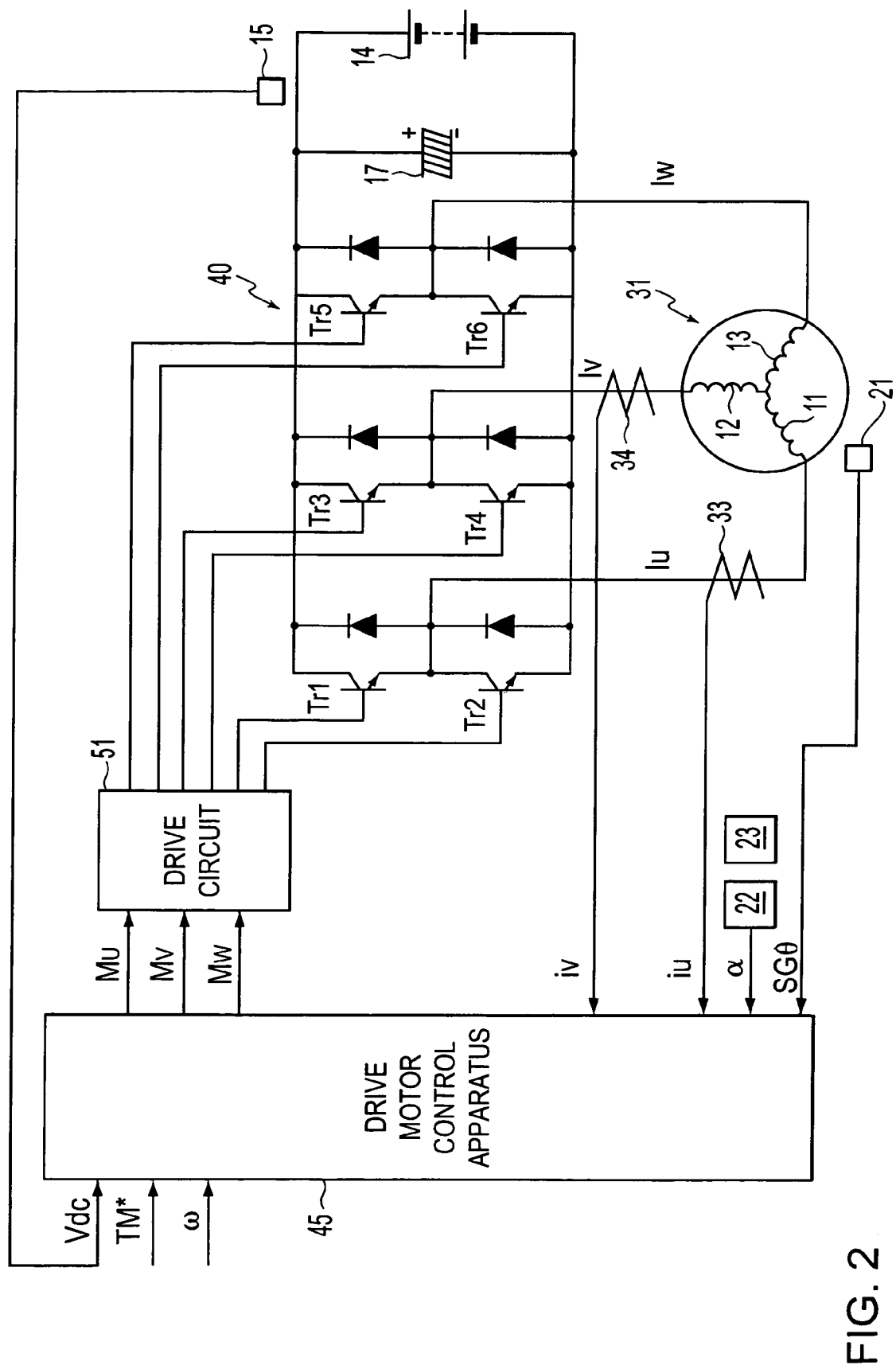
FIG. 2 is a schematic diagram of an electric drive control apparatus in an embodiment of the invention.
Figure 3:
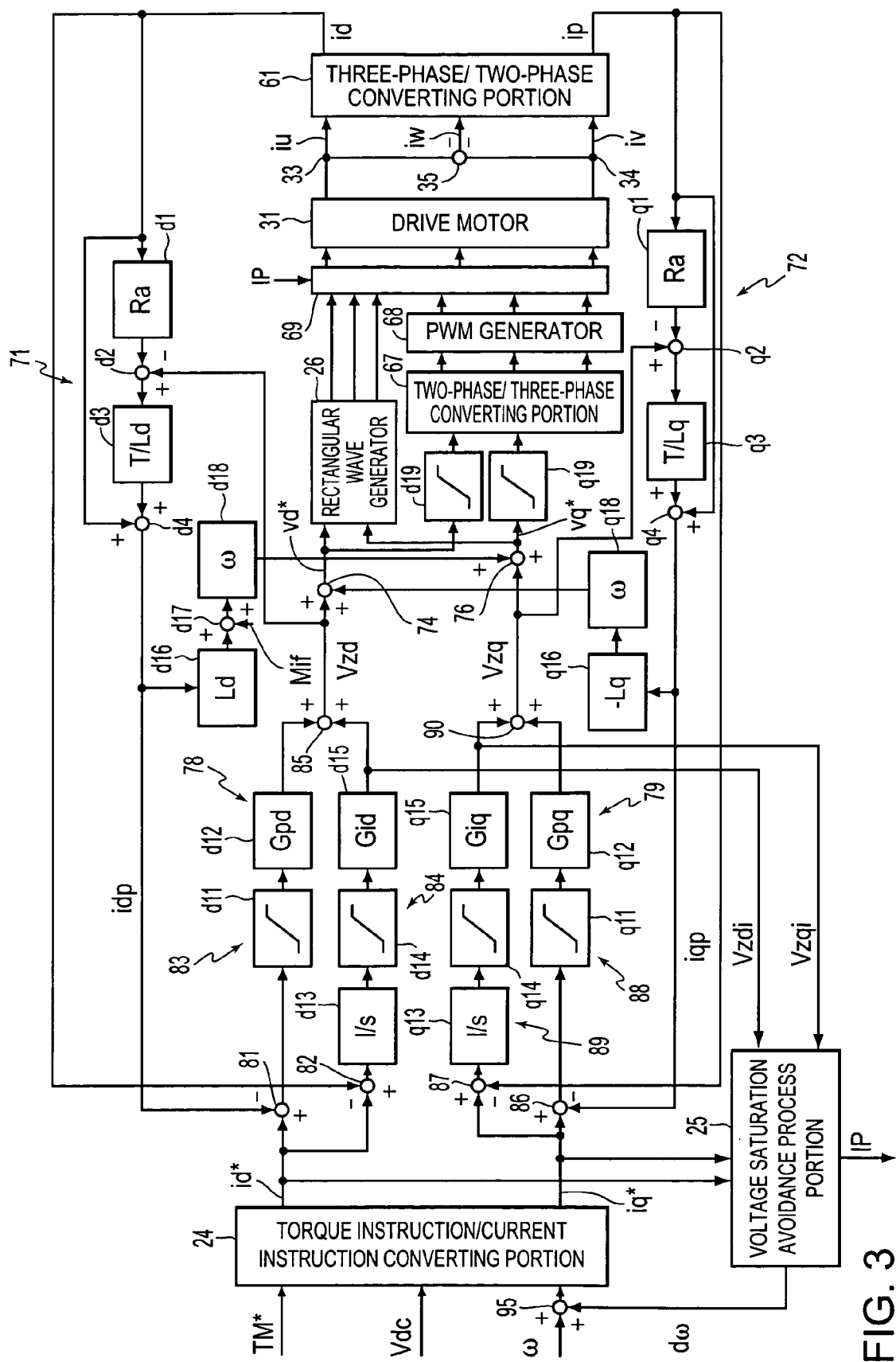
FIG. 3 is a block diagram of the electric drive control apparatus in the embodiment of the invention.
Figure 4:
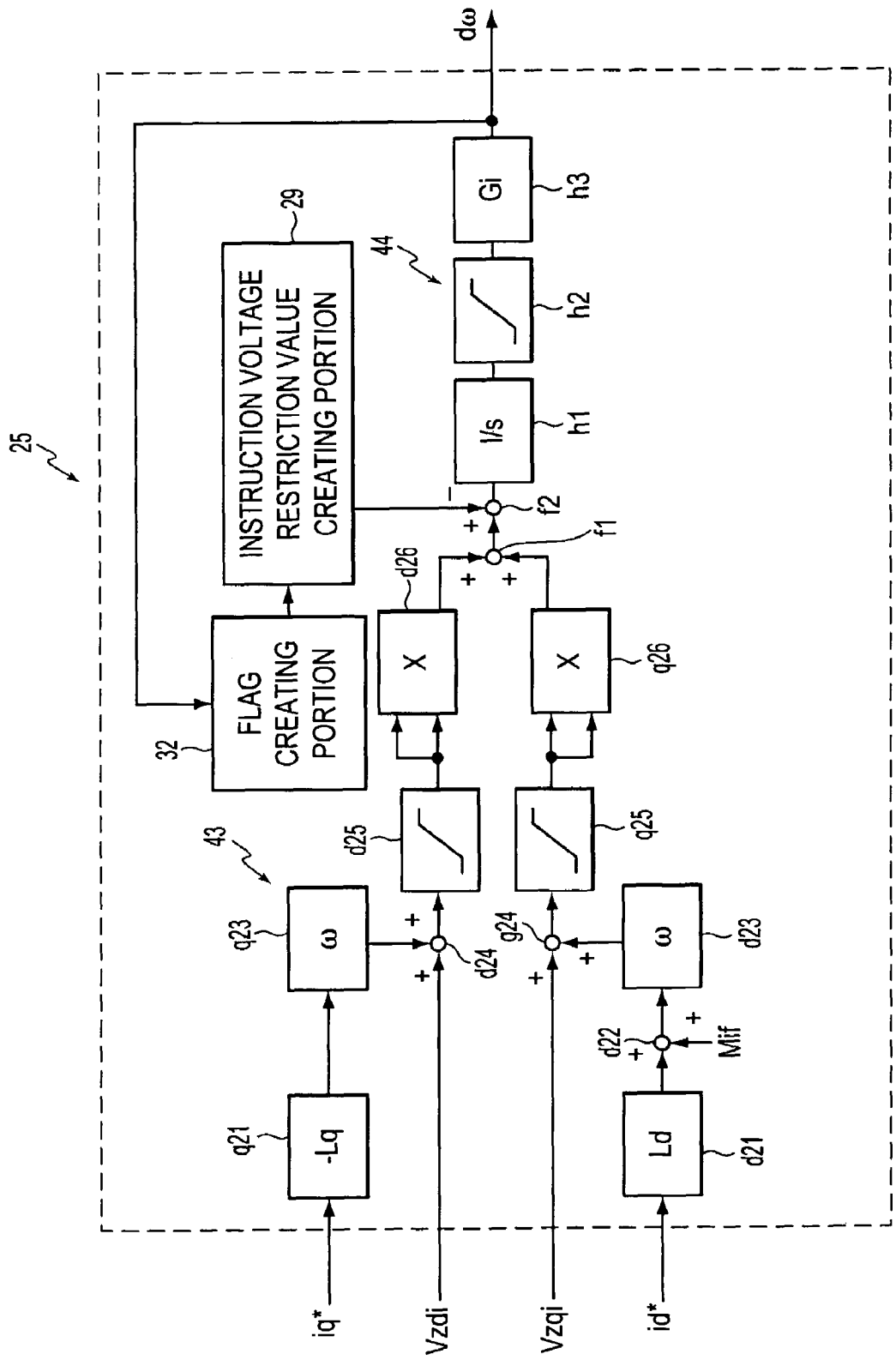
FIG. 4 is a block diagram of a voltage saturation avoidance process portion in an embodiment of the invention.

As shown in FIGS. 2–4, reference numeral 31 denotes a drive motor as an electric machine. In the embodiment, the drive motor 31 is a DC brushless drive motor and is connected to, for example, a drive shaft (not shown) or the like of an electric vehicle. The drive motor 31 has a rotor (not shown) that is rotatably disposed and a stator that is disposed radially outward of the rotor. The rotor has a rotor core, and a plurality of permanent magnets disposed at locations on the rotor spaced from each other in a circumferential direction of the rotor core. The south pole and the north pole of each permanent magnet form a magnetic pole pair. The stator has a stator core (not shown) that has, at a plurality of locations in a circumferential direction, teeth protruded radially inward. The stator further has stator coils 11–13 wound on the teeth as U-phase, V-phase and W-phase coils.

An output shaft of the rotor is provided with a pulse generating type magnetic pole position sensor 21 as a magnetic pole position detecting portion for detecting the magnetic pole position θ. The magnetic pole position sensor 21 generates a magnetic pole position signal SGθ as a sensor output, and sends the signal to a drive motor control apparatus 45 that acts as an electric machine control apparatus.

In order to drive the drive motor 31 so as to run the electric vehicle, the DC current from a battery 14 is converted into phase currents, that is, U-phase, V-phase and W-phase currents Iu, Iv, Iw, by an inverter 40 that acts as an electric current generating device. The U-phase, V-phase and W-phase currents Iu, Iv, Iw are supplied separately to the stator coils 11–13.

To that end, the inverter 40 has six transistors Tr1 to Tr6 as switching elements. By selectively turning the transistors Tr1 to Tr6 on and off, the U-phase, V-phase and W-phase currents Iu, Iv, Iw can be generated.

In the embodiment, the inverter 40 is adopted as an electric current generating device. The inverter 40 adopted in the embodiment may be a power module, for example, an IGBT (insulated gate bipolar transistor) formed by integrating two to six switching elements into a single package, or the like, and may also be an IPM (intelligent power module) formed by incorporating drive circuits and the like into an IGBT.

A voltage sensor 15 is disposed as a voltage detecting portion at an input side of the inverter 40 where current from the battery 14 is input to the inverter 40. The voltage sensor 15 detects the DC voltage Vdc at the input side of the inverter 40 and sends the detected value to the drive motor control apparatus 45. A battery voltage may be used as the DC voltage Vdc. In that case, the battery 14 is provided with a battery voltage sensor as a voltage detecting portion.

The drive motor 31, the inverter 40 and driving wheels (not shown) form an electric drive apparatus. Reference numeral 17 denotes a capacitor connected in parallel with the battery 14.

The stator coils 11 to 13 are star-connected. Therefore, if currents of two phases of the three phases are determined, the current of the remaining phase is also determined. Hence, in order to control the currents Iu, Iv, Iw of the three phases, current sensors 33, 34 are disposed on lead wires of the stator coils 11 to 13 of the U phase and the V phase, as current detecting portions for detecting the U-phase and V-phase currents Iu, Iv. The current sensors 33, 34 send the detected currents iu, iv to the drive motor control apparatus 45.

The drive motor control apparatus 45 includes a CPU (not shown) that functions as a computer, and recording devices (not shown), such as a RAM, a ROM, etc., for recording data, various programs, etc. Electric current instruction value maps are set in the ROM.

The ROM is provided so that various programs and data can be recorded therein. However, it is also possible to record programs and data into an external recording medium in a similar fashion. In that case, for example, a flash memory is provided in the drive motor control apparatus 45. Therefore, the aforementioned programs and data are read out from the external recording medium, and are recorded into the flash memory. Therefore, the programs, data, and the like can be updated by replacing the external recording medium.

Reference numeral 22 denotes an accelerator sensor disposed adjacent to an accelerator pedal 23 that acts as an accelerator operating portion. Acceleration angle α indicating an amount of operation (amount of depression) of the accelerator pedal 23 is detected by the accelerator sensor 22.

Next, operations of the drive motor control apparatus 45 will be described. First, a position detection process means (not shown) of the drive motor control apparatus 45 executes a position detection process. In the process, the position detection process means reads in a magnetic pole position signal SGθ, and detects a magnetic pole position θ on the basis of the magnetic pole position signal SGθ. To that end, an electric machine rotation speed computation process means of the position detection process means executes an electric machine rotation speed computation process. In the process, the electric machine rotation speed computation process means computes an average rate of pulse intervals occurring in the magnetic pole position signal SGθ, as an electrical angular speed ω, that is, a control variable. A magnetic pole position computation process means of the position detection process means executes a magnetic pole position computation process to compute a magnetic pole position θ in accordance with the electrical angular speed ω.

The electric machine rotation speed computation process means computes a drive motor rotation speed NM as an electric machine rotation speed from the electrical angular speed ω as in:

$$NM = 60 \cdot \omega / 2\pi$$

Subsequently, a voltage saturation avoidance process portion 25, which is a control variable correction process means of the position detection process means, executes a control variable correction process as described below in which the process portion 25 computes a voltage saturation variable λ that changes in accordance with the driving of the drive motor 31 and that indicates the likelihood of occurrence of voltage saturation, and corrects the electrical angular speed ω on the basis of the voltage saturation variable λ.

Next, a drive motor control process means (not shown) of the drive motor control apparatus 45 executes a drive motor control process to drive the drive motor 31 on the basis of the detected currents iu, iv, iw, the magnetic pole position θ, the DC voltage Vdc, and the electrical angular speed ω.

To that end, a vehicle speed detection process means (not shown) of the drive motor control apparatus 45 executes a vehicle speed detection process in which the process portion detects a vehicle speed V corresponding to the drive motor rotation speed NM, and sends the detected vehicle speed V to a vehicle control apparatus (not shown) that performs overall control of the electric motor vehicle. Then, a vehicular instruction value computation process means of the vehicle control apparatus executes a vehicular instruction value computation process. In the process, the vehicular instruction value computation process portion reads in the vehicle speed V and the accelerator opening degree α, and computes a vehicle requested torque TO* from the vehicle speed V and the accelerator opening degree α. Corresponding to the vehicle requested torque TO*, the process portion causes generation of a target drive motor torque (torque instruction value) TM* that represents a target value of the drive motor torque TM. The process portion then sends the target drive motor torque TM* to the drive motor control apparatus 45. Incidentally, the drive motor torque TM forms an electric machine torque, and the target drive motor torque TM* forms a target electric machine torque.

The drive motor control apparatus 45 is designed to perform a feedback control through a vector control calculation on a d-q axes model in which the d axis is defined in a direction of a magnetic pole pair of the rotor and the q axis is defined in a direction perpendicular to the d axis.

A torque instruction/current instruction converting portion 24, which is a driver instruction value computation process means of the drive motor control process means, executes an electric current instruction value computation process as follows. The torque instruction/current instruction converting portion 24 reads in the target drive motor torque TM*, the DC voltage Vdc and the electrical angular speed ω. Then, the process portion computes electric current instruction values, that is, a d-axis current instruction value id* and a q-axis current instruction value iq* that indicate a target value of d-axis current id and a target value of q-axis current iq, respectively, with reference to an electric current instruction value map (not shown) and an electric current phase instruction value map (not shown).

The electric current instruction value map and the electric current phase instruction value map are set separately for individual DC currents Vdc. If a target drive motor torque TM* and an electrical angular speed ω are given, it is possible to compute the lengths of the vectors of the d-axis current instruction value id* and the q-axis current instruction value iq* as well as the electric current phase. Thus, the d-axis current instruction value id* and the q-axis current instruction value iq* can be computed in accordance with the vector lengths and the electric current phase. Instead of the electric current instruction value map and the electric current phase instruction value map, it is possible to use an electric current instruction value map that allows direct computation of the d-axis current instruction value id* and the q-axis current instruction value iq*.

The torque instruction/current instruction converting portion 24 forms a first driver instruction value computation process means. The first driver instruction value computation process means executes a first instruction value computation process of computing the d-axis current instruction value id* and the q-axis current instruction value iq* as first instruction values.

Next, a detected current acquisition process means of the drive motor control process means executes a detected current acquisition process. That is, the process means reads in and acquires the detected currents iu, iv, and a calculator 35 of the detected current acquisition process portion computes and acquires a detected current iw on the basis of the detected currents iu, iv as in:

$$iw = -iu - iv$$

It is also possible to dispose a current sensor for detecting a detected current iw.

Subsequently, a three phase/two phase converting portion 61, which is a first conversion process means of the drive motor control process means, executes a three phase/two phase conversion process as a first conversion process. That is, the converting portion 61 reads in the magnetic pole position θ, and converts the detected currents iu, iv, iw into a d-axis current id and a q-axis current iq.

The d-axis current id and the q-axis current iq are computed as actual currents, and the d-axis current instruction value id* and the q-axis current instruction value iq* are computed as described above. Then, on the basis of the d-axis current id and the q-axis current iq as well as the d-axis current instruction value id* and the q-axis current instruction value iq*, a feedback control is executed so that a d-axis current deviation Δid between the d-axis current id and the d-axis current instruction value id* and a q-axis current deviation Δiq between the q-axis current iq and the q-axis current instruction value iq* become zero.

If a driver rapidly starts and accelerates the vehicle by forcefully depressing the accelerator pedal 23, the d-axis current instruction value id* and the q-axis current instruction value iq* may sometimes sharply change. In such a case, an increased gain in the feedback control cannot be achieved if the sampling period of the detected currents iu, iv, iw is long. Therefore, in order to virtually reduce the sampling period, a d-axis current id and a q-axis current iq that occur following the sampling of detected currents iu, iv, iw are predicted. For example, a d-axis current id and a q-axis current iq that occur following a predetermined number of sampling timings (one sampling timing in this embodiment) are predicted.

In predicting the d-axis current id and the q-axis current iq, current prediction errors may occur in the predicted d-axis current idp and the predicted q-axis current iqp if the currents Iu, Iv, Iw supplied to the stator coils 11 to 13 change and therefore the inductances Ld, Lq of the stator coils 11 to 13 change. In such a case, it becomes difficult to bring the d-axis current deviation Δid and the q-axis current deviation Δiq closer to zero through the feedback control, so that steady deviations occur between the d-axis current id and the d-axis current instruction value id* and between the q-axis current iq and the q-axis current instruction value iq*.

In the embodiment, therefore, a proportional control is executed on the basis of the predicted d-axis current idp and the predicted q-axis current iqp, and an integral control is executed on the basis of the actual d-axis current id and the actual q-axis current iq.

To that end, the d-axis current id is, on one hand, sent to a current predicting portion 71, that is, an electric current prediction process portion of the drive motor control process means. The current predicting portion 71 executes an electric current prediction process. In the process, a d-axis current id that will occur one sampling timing later is predicted. The predicted d-axis current idp is sent as a predicted current to a subtracter 81 that acts as a predicted deviation computation process means of the drive motor control process means. The d-axis current id is, on the other hand, sent as an actual current directly to a subtracter 82 that acts as an actual deviation computation process means of the drive motor control process means.

Let it be assumed that the current predicting portion 71 includes a multiplier (Ra)d1, a subtracter d2, a multiplier (T/Ld)d3, and an adder d4. Then, the value id(n) of the predicted d-axis current idp at a sampling timing immediately following the present sampling timing is expressed as in:

$$id(n) = id(n-1) + (T/Ld)\{Vzd(n-1) - Ra \cdot id(n-1)\}$$

where: (n−1) is the present sampling timing; n is a sampling timing immediately following the present sampling timing; id(n−1) is the present d-axis current id; T is the sampling period; Ld is the inductance on the d axis of the stator coils 11 to 13; Ra is the resistance of the stator coils 11 to 13; and Vzd(n−1) is the present value of voltage fall Vzd.

Then, the subtracter 81 executes a predicted deviation computation process. Specifically, the subtracter 81 computes a predicted d-axis current deviation Δidp, that is, a predicted deviation between the d-axis current idp and the d-axis current instruction value id*. The subtracter 82 executes an actual deviation computation process. Specifically, the subtracter 82 computes an actual d-axis current deviation Δid, that is, an actual deviation between the d-axis current id and the d-axis current instruction value id*. The d-axis current deviations Δidp, Δid are sent to a voltage instruction value computing portion 78 which acts as a voltage instruction value computation process portion of the drive motor control process means.

Likewise, the q-axis current iq is, on one hand, sent to a current predicting portion 72 that acts as an electric current prediction process means. The current predicting portion 72 executes an electric current prediction process. That is, a q-axis current iq at a sampling timing immediately following the present sampling timing is computed and thus predicted. The predicted q-axis current iqp is sent as a predicted current to a subtracter 86 that acts as a predicted deviation computation process means of the drive motor control process means. The q-axis current iq is, on the other hand, directly sent as an actual current to a subtracter 87 that acts as an actual deviation computation process means of the drive motor control process means.

Let it be assumed that the current predicting portion 72 includes a multiplier (Ra)q1, a subtracter q2, a multiplier (T/Lq)q3, and an adder q4. Then, the value iq(n) of the predicted q-axis current iqp at a sampling timing immediately following the present sampling timing is expressed as in:

$$iq(n)=iq(n-1)+(T/Lq)\{Vzq(n-1)-Ra\cdot iq(n-1)\}$$

where: iq(n−1) is the present q-axis current iq; Lq is the inductance on the q axis of the stator coils 11 to 13; and Vzq(n−1) is the present value of voltage fall Vzq.

Then, the subtracter 86 executes a predicted deviation computation process. Specifically, the subtracter 86 computes a predicted q-axis current deviation Δiqp, that is, a predicted deviation between the q-axis current iqp and the q-axis current instruction value iq*. The subtracter 87 executes an actual deviation computation process. Specifically, the subtracter 87 computes an actual q-axis current deviation Δiq, that is, an actual deviation between the q-axis current iq and the q-axis current instruction value iq*. The q-axis current deviations Δiqp, Δiq are sent to a voltage instruction value computing portion 79 that acts as a voltage instruction value computation process means of the drive motor control process means.

The voltage instruction value computing portion 78 executes a voltage instruction value computation process of computing a d-axis voltage instruction value as a voltage instruction value such that the d-axis current deviations Δidp, Δid become zero. The voltage instruction value computing portion 79 executes a voltage instruction value computation process of computing a q-axis voltage instruction value vq* as a voltage instruction value such that the q-axis current deviations Δiqp, Δiq become zero.

The voltage instruction value computing portions 78, 79 form a second instruction value computation process means and a proportional-plus-integral calculation process means. The voltage instruction value computation process forms a second instruction value computation process and a proportional-plus-integral (PI) calculation process. The d-axis voltage instruction value vd* and the q-axis voltage instruction value vq* form a second instruction value. The first and second instruction value computation process means form an instruction value computation process means 91 (FIG. 1). The instruction value computation process means 91 executes first and second instruction value computation process.

The voltage instruction value computing portion 78 includes a proportional calculating portion 83 that acts as a proportional calculation process means, and an integral calculating portion 84 that acts as an integral calculation process means, as well as an adder 85 that acts as a voltage fall computation process means, and an adder 74 that acts as a voltage computation process means. In the proportional calculating portion 83, a proportional calculation process is executed by a limiter d11 and a gain multiplier (Gpd)d12. Specifically, on the basis of the d-axis current deviation Δidp and the gain Gpd for proportional calculation, a voltage fall Vzdp indicating a voltage instruction value corresponding to a proportional term is computed as a proportional calculation value.

$$Vzdp=Gpd\cdot\Delta idp$$

In the integral calculating portion 84, an integral calculation process is executed by an integrator (1/s)d13, a limiter d14 and a gain multiplier (Gid)d15. Specifically, on the basis of the d-axis current deviation Δid and the gain Gid for integral calculation, a voltage fall Vzdi indicating a voltage instruction value corresponding to an integral term is computed as an integral calculation value.

$$Vzdi=Gid\cdot\Sigma\Delta id$$

Then, the adder 85 executes a voltage fall computation process in which a voltage fall Vzd is computed by adding voltage falls Vzdp, Vzdi together.

$$Vzd = Vzdp + Vzdi$$
$$= Gpd\cdot\Delta idp + Gid\cdot\Sigma\Delta id$$

Incidentally, the limiter d11 restricts divergence of the d-axis current deviation Δidp, and the limiter d14 restricts divergence of the integral ΣΔid.

A first induced voltage computation process means of the drive motor control process means executes a first induced voltage computation process. Specifically, the process portion reads in the electrical angular speed ω and the q-axis current iqp, and computes an induced voltage ed induced by the q-axis current iqp, on the basis of the electrical angular speed ω, the q-axis current iqp and the inductance Lq on the q axis, through the use of a multiplier (−Lq)q16 and a multiplier (ω)q18.

$$ed=-\omega\cdot Lq\cdot iqp$$

Subsequently, the adder 74 adds the induced voltage ed to the voltage fall Vzd sent from the adder 85, and computes a d-axis voltage instruction value vd* as an output voltage.

$$vd^* = Vzd + ed$$
$$= Vzd - \omega\cdot Lq\cdot iqp$$

In this manner, a d-axis voltage instruction value vd* is generated so that the d-axis current deviations Δidp, Δid become zero. The d-axis voltage instruction value vd* is sent to a two-phase/three-phase converting portion 67 that acts as a second conversion process means of the drive motor control process means via a limiter d19. The limiter d19 restricts divergence of the d-axis voltage instruction value vd*.

On the other hand, the voltage instruction value computing portion 79 includes a proportional calculating portion 88 that acts as a proportional calculation process means, and further includes an integral calculating portion 89 that acts as an integral calculation process means, as well as an adder 90 that acts as a voltage fall computation process means, and an adder 76 that acts as a voltage computation process means. In the proportional calculating portion 88, a proportional calculation process is executed by a limiter q11 and a gain multiplier (Gpq)q12. In the process, on the basis of the q-axis current deviation Δiqp and the gain Gpq for proportional calculation, a voltage fall Vzqp indicating a voltage instruction value corresponding to a proportional term is computed as a proportional calculation value.

$$Vzqp = Gpq \cdot \Delta iqp$$

In the integral calculating portion 89, an integral calculation process is executed by an integrator (1/s)q13, a limiter q14 and a gain multiplier (Giq)q15. Specifically, on the basis of the q-axis current deviation Δiq and the gain Giq for integral calculation, a voltage fall Vzqi indicating a voltage instruction value corresponding to an integral term is computed as an integral calculation value.

$$Vzqi = Giq \cdot \Sigma \Delta iq$$

The adder 90 executes a voltage fall computation process in which a voltage fall Vzq is computed by adding voltage falls Vzqp, Vzqi.

$$Vzq = Vzqp + Vzqi$$
$$= Gpq \cdot \Delta iqp + Giq \cdot \Sigma \Delta iq$$

Incidentally, the limiter q11 restricts divergence of the q-axis current deviation Δiqp, and the limiter q14 restricts divergence of the integral ΣΔiq.

A second induced voltage computation process means of the drive motor control process means executes a second induced voltage computation process. Specifically, the process portion reads in the electrical angular speed ω and the d-axis current id, and computes an induced voltage eq induced by the d-axis current idp, on the basis of the electrical angular speed ω, the counter electromotive voltage constant Mif, the d-axis current idp, and the inductance Ld on the d axis, through the use of a multiplier (Ld)d16, an adder 17 and a multiplier (ω)d18.

$$eq = \omega(Mif + Ld \cdot idp)$$

Subsequently, the adder 76 adds the induced voltage eq to the voltage fall Vzq sent from the adder 90, and computes a q-axis voltage instruction value vq* as an output voltage.

$$vq^* = Vzq + eq$$
$$= Vzq + \omega(Mif + Ld \cdot idp)$$

In this manner, a q-axis voltage instruction value vq* is generated so that the q-axis current deviations Δiqp, Δiq become zero. The q-axis voltage instruction value vq* is sent to the two-phase/three-phase converting portion 67 via a limiter q19. The limiter q19 restricts divergence of the q-axis voltage instruction value vq*.

Subsequently, the two-phase/three-phase converting portion 67 reads in the d-axis voltage instruction value vd*, the q-axis voltage instruction value vq* and the magnetic pole position θ, and executes a two-phase/three-phase conversion as a second conversion process. In the process, the d-axis voltage instruction value vd* and the q-axis voltage instruction value vq* are converted into voltage instruction values Vu*, Vv*, Vw* of the U phase, the V phase and the W phase. The voltage instruction values Vu*, Vv*, Vw* are sent to a PWM generator 68 that acts as an asynchronous PWM signal generation process means and a first signal generation process means of the drive motor control process means.

The PWM generator 68 executes a first signal generation process and an asynchronous PWM signal generation process. Specifically, on the basis of the voltage instruction values Vu*, Vv*, Vw* of the three phases and the DC voltage Vdc, the PWM generator 68 generates pulse width modulation signals Mu, Mv, Mw of the three phases as asynchronous PWM signals having a pulse width corresponding to the d-axis current instruction value id* and the q-axis current instruction value iq*. Incidentally, the pulse width modulation signals Mu, Mv, Mw form a first drive signal.

The pulse width modulation signals Mu, Mv, Mw are sent to a drive circuit 51 disposed outside the drive motor control apparatus 45, via a selector 69. Upon receiving the pulse width modulation signals Mu, Mv, Mw, the drive circuit 51 generates six gate signals, and sends the gate signals to the inverter 40. The inverter 40 generates currents Iu, Iv, Iw of the three phases by switching on and off transistors Tr1 to Tr6 at every predetermined carrier period on the basis of the pulse width modulation signals Mu, Mv, Mw. The currents Iu, Iv, Iw of the three phases are then supplied to the stator coils 11 to 13 of the drive motor 31.

In this manner, on the basis of the target drive motor torque TM*, torque control is executed through the asynchronous PWM control, so that the drive motor 31 is operated so as to drive the electric motor vehicle.

Figure 10:
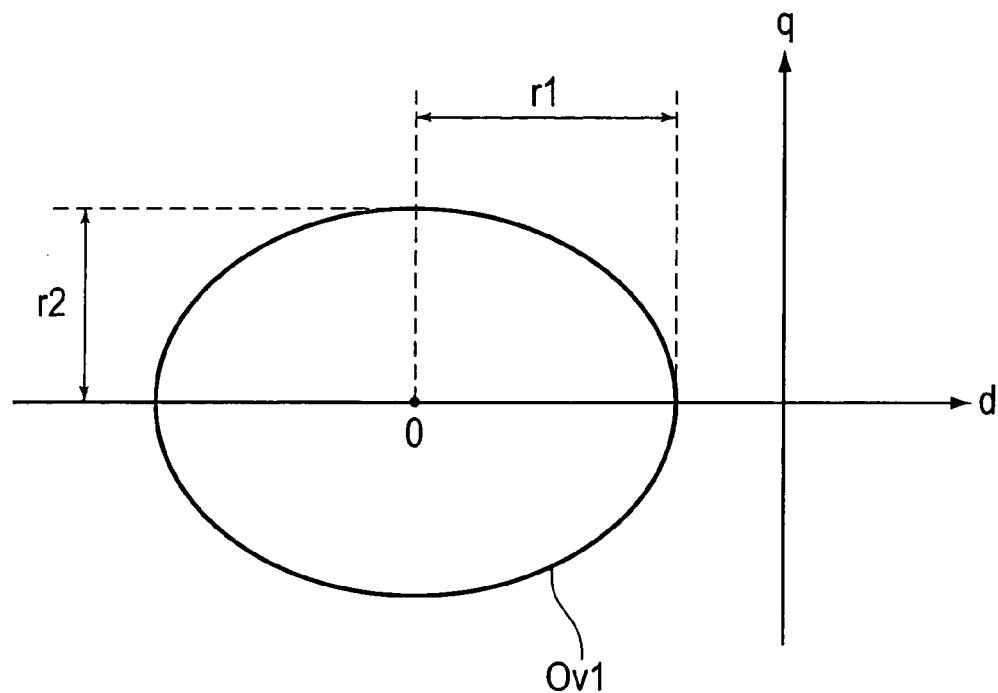
FIG. 10 is a graph indicating a voltage restriction ellipse in accordance with an embodiment of the invention.

In conjunction with the asynchronous PWM control, in order to supply the stator coils 11 to 13 of the drive motor 31 with the currents Iu, Iv, Iw of the three phases having a predetermined amplitude and predetermined phases, it is necessary to appropriately switch on and off the transistors Tr1 to Tr6 of the inverter 40 so as to apply predetermined voltages Vu, Vv, Vw to the stator coils 11 to 13 by taking into account the resistance Ra, the inductances Ld, Lq, the counter electromotive voltage, etc. If the counter electromotive voltage becomes considerably high as the electrical angular speed ω increases and the drive motor rotation speed NM rises, it becomes impossible to apply the predetermined voltages Vu, Vv, Vw to the stator coils 11 to 13 provided that a predetermined battery voltage VB (or DC voltage Vdc) remains unchanged. As a result, the drive motor 31 reaches an output limit indicated by a voltage restriction ellipse Ov1 in a rotating coordinate system having the d axis and the q axis shown in FIG. 10. Then, if the drive motor 31 reaches the output limit, the proportional-plus-integral process executed by the voltage instruction value computing portions 78, 79 undergoes divergence.

An instruction voltage Vlim provided when the pulse width modulation signals Mu, Mv, Mw reach a full-on state where the on-duration represented by the pulse width becomes maximum is expressed as in:

$$Vlim = \sqrt{(vdlim^2 + vqlim^2)} \quad (1)$$

A d-axis voltage instruction value vdlim and a q-axis voltage instruction value vqlim during a full-on and steady state are expressed as in:

$$vdlim = Ra \cdot idlim - \omega \cdot Lq \cdot iqlim \quad (2)$$

$$vqlim = Ra \cdot iqlim + \omega(Mif + Ld \cdot idlim) \quad (3)$$

Therefore, the voltage restriction ellipse Ov1 can be expressed as in equation (4) by substituting equations (2), (3) in equation (1) and assuming that the resistance Ra is small.

$$\frac{(id \lim + Mif/Ld)^2}{(V \lim/\omega \cdot Ld)^2} + \frac{iq \lim^2}{(V \lim/\omega \cdot Lq)^2} = 1 \quad (4)$$

Then, the coordinates of the center of the voltage restriction ellipse Ov1 are (−Mif/Ld, 0). The "radius" r1 along the major axis of the ellipse is given by:

$$r1 = Vlim/(\omega \cdot Ld)$$

The "radius" r2 along the minor axis is given by:

$$r2 = Vlim/(\omega \cdot Lq)$$

Since the output limit of the drive motor 31 is expressed by the voltage restriction ellipse Ov1 as mentioned above, the d-axis current instruction value id* and the q-axis current instruction value iq* cannot take values outside the voltage restriction ellipse Ov1. The d-axis current instruction value id* and the q-axis current instruction value iq* by the center of the voltage restriction ellipse Ov1

$$id^* = Mif/Ld$$

$$iq^* = 0$$

are safest from voltage saturation. Divergence in control due to voltage saturation is more likely to occur with d-axis current instruction values id* and q-axis current instruction values iq* that are represented by points closer to the voltage restriction ellipse Ov1.

Voltage saturation may occur if an unattainable d-axis current instruction value id* and an unattainable q-axis current instruction value iq* are set when an error ωe occurs in the detected electrical angular speed ω in a case where the speed of the drive motor 31 fluctuates greatly due to vibrations thereof or the like.

If voltage saturation thus occurs, the actually generated drive motor torque TM drifts from the target drive motor torque TM*, so that as the vehicle runs, a driver may feel uncomfortable, or the driving of the drive motor may become difficult.

For example, in a rotating coordinate system having the d axis and the q axis, the electric current instruction value can be expressed by a vector B that has a vector length E and a current phase β (i.e., angle between the vector and the d axis), and the d-axis current instruction value id* and the q-axis current instruction value iq* can be expressed as in:

$$id^* = -E \cdot \sin \beta$$

$$iq^* = E \cdot \cos \beta$$

Figure 11:
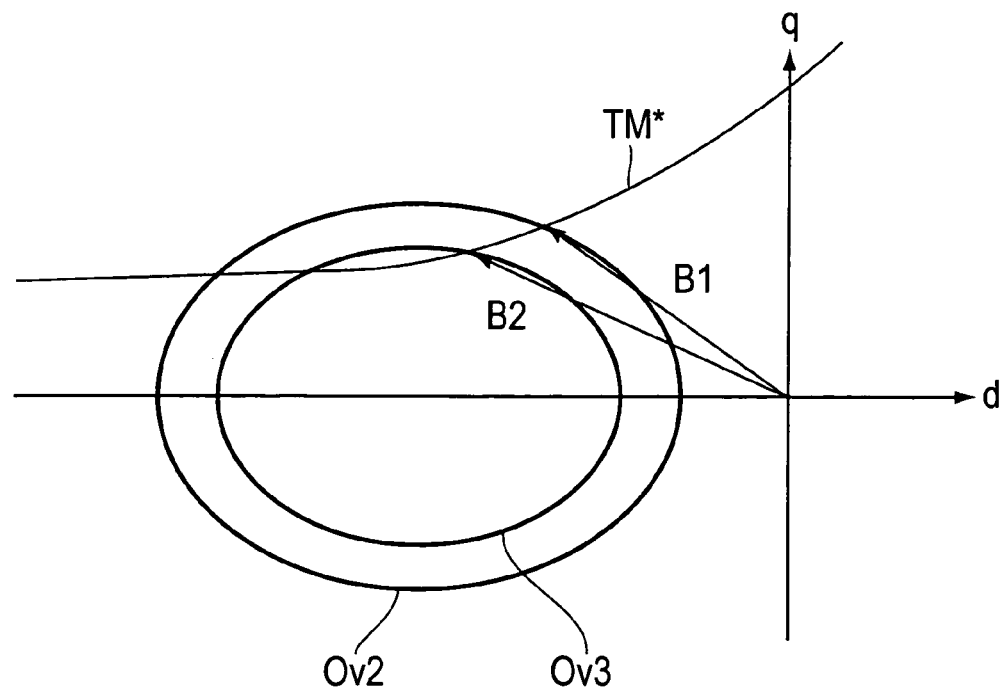
FIG. 11 is a graph illustrating a relationship between the asynchronous PWM control and an automatic field weakening control in an embodiment of the invention.

If in this case it is determined that the electrical angular speed ω is relatively low and therefore a current instruction value indicated by a vector B1 is selected as illustrated in FIG. 11 while the actual current value is rather high, voltage saturation will occur. In order to avoid voltage saturation in this case, it is necessary to select, for example, the current instruction value that is on an equal torque curve indicated by a predetermined target drive motor torque TM* and that is indicated by a vector B2. In FIG. 11, reference character Ov2 denotes a voltage restriction ellipse that is used in the case where it is determined that the electrical angular speed ω is relatively low, and reference character Ov3 denotes a voltage restriction ellipse corresponding to the actual electrical angular speed ω.

Voltage saturation may also occur if there is a detection error in any one of various sensors, such as the current sensors 33, 34, the magnetic pole position sensor 21, the voltage sensor 15, etc., or if a change in an appliance constant, such as the counter electromotive voltage Mif, the inductances Ld, Lq, the resistance Ra, etc., occurs in conjunction with a temperature change. If in such a case, the magnetic pole position θ detected by the magnetic pole position sensor 21 has an error θe, a rotating coordinate system having the d axis and the q axis inclined by the error θe is formed. As a result, the stator coils 11 to 13 are energized with the current phase β−θe, and an unattainable current instruction value represented by a vector that is rotated by the error θe is generated. In that case, too, the vector is outside the voltage restriction ellipse, so that voltage saturation will occur.

Therefore, in order to prevent the occurrence of voltage saturation, the drive motor control apparatus 45 is provided with the voltage saturation avoidance process portion 25 and an adder 95. The voltage saturation avoidance process portion 25 includes a voltage saturation variable computing portion 43 as a voltage saturation variable computation process means, and an electrical angular speed correction value computing portion 44 as a control variable correction value computation process means. The voltage saturation variable computing portion 43 executes a voltage saturation variable computation process. In the process, a voltage saturation variable λ is computed on the basis of a variable that is not affected by noises, for example, the d-axis current instruction value id*, the q-axis current instruction value iq* and the voltage falls Vzdi, Vzqi in the embodiment. The electrical angular speed correction value computing portion 44 executes an electrical angular speed correction value computation process. Specifically, the electrical angular speed correction value computing portion 44 performs an integration based on the voltage saturation variable λ so as to compute an electrical angular speed correction value dω for correcting the electrical angular speed ω. The adder 95 adds the electrical angular speed correction value dω to the electrical angular speed ω to compute a value ω+dω, and sends the value ω+dω as a post-correction electrical angular speed ω to the torque instruction/current instruction converting portion 24.

To that end, in the voltage saturation variable computing portion 43, a voltage instruction value −ω·Lq·iq* corresponding to a non-interacting term is computed by a multiplier (−Lq)q21 and a multiplier (ω)q23 on the basis of the q-axis current instruction value iq*. The non-interacting term-corresponding voltage instruction value −ω·Lq·iq* and the voltage fall Vzdi indicating the integral term-corresponding voltage instruction value are added together by an adder d24 to compute a d-axis voltage instruction value vdf*. Furthermore, a voltage instruction value ω(Mif+Ld·id*) corresponding to a non-interacting term is computed by a multiplier (Ld)d21, an adder d22, and a multiplier (ω)d23 on the basis of the d-axis current instruction value id*. The non-interacting term-corresponding voltage instruction value ω(Mif+Ld·id*) and the voltage fall Vzqi indicating the integral term-corresponding voltage instruction value are added together by an adder q24 to compute a q-axis voltage instruction value vqf*.

The d-axis current instruction value id* and the q-axis current instruction value iq* are computed on the basis of the electrical angular speed ω. Since the electrical angular speed ω does not include the error θe in the magnetic pole position θ in computation process, the electrical angular speed ω is not affected by noises. Furthermore, the voltage falls Vzdi, Vzqi are computed through the integration calculation process executed by the integral calculating portions 84, 89, and therefore influences of noises thereon can be ignored. Hence, the d-axis voltage instruction value vdf* and the q-axis voltage instruction value vqf* are not affected by noises. Furthermore, since the d-axis voltage instruction value vdf* and the q-axis voltage instruction value vqf* are computed on the basis of the d-axis current instruction value id* and the q-axis current instruction value iq*, occurrence of voltage saturation can be detected during an early period.

The voltage falls Vzdp, Vzqp indicating the proportional term-corresponding voltage instruction values are substantially zero during the steady state, so that the voltage falls Vzdp, Vzqp are ignored in computing the d-axis voltage instruction value vdf* and the q-axis voltage instruction value vqf*.

Subsequently, in the voltage saturation variable computing portion 43, the d-axis voltage instruction value vdf* is sent to a multiplier d26(x) via a limiter d25, and is squared by the multiplier d26(x). The q-axis voltage instruction value vqf* is sent to a multiplier q26(x) via a limiter q25, and is squared by the multiplier q26(x). The value vdf*$^2$ and the value vqf*$^2$ are added together by an adder f1, and an instruction voltage Vom is computed.

$$Vom=\sqrt{(vdf^{*2}+vqf^{*2})}$$

Incidentally, the limiter d25 restricts divergence of the d-axis voltage instruction value vdf*, and the limiter q25 restricts divergence of the q-axis voltage instruction value vqf*.

Subsequently, an instruction voltage restriction value creating portion 29 that acts as an instruction voltage restriction value computation process means of the voltage saturation avoidance process portion 25 executes an instruction voltage restriction value computation process. Specifically, the instruction voltage restriction value creating portion 29 reads in the DC voltage Vdc and, on the basis of DC voltage Vdc, computes an instruction voltage restriction value Vom* that represents a target value of the instruction voltage Vom that is used to prevent the occurrence of voltage saturation.

$$Vom^*=\sqrt{((2/3)Vdc)}$$

The instruction voltage restriction value creating portion 29 sends the instruction voltage restriction value Vom* to a subtracter f2.

Then, in the voltage saturation variable computing portion 43, the subtracter f2 computes a deviation ΔVom between the instruction voltage restriction value Vom* and the instruction voltage Vom as a voltage saturation variable λ, as follows:

$$\Delta Vom = Vom - Vom^*$$

The subtracter f2 sends the deviation ΔVom to the electrical angular speed correction value computing portion 44.

Subsequently, in the electrical angular speed correction value computing portion 44, the deviation ΔVom is integrated by an integrator (1/s)h1 to acquire an integral ΣΔVom. Divergence of the integral ΣΔVom is restricted by a limiter h2, and an integral component Gi·ΣΔVom is computed as an electrical angular speed correction value dω by a gain multiplier (Gi)h3. The limiter h2 operates so as to prevent the integral ΣΔVom from exceeding a predetermined voltage during execution of the asynchronous PWM control.

After the electrical angular speed correction value dω is computed as described above, the electrical angular speed correction value dω is sent to the adder 95. The adder 95 then adds the electrical angular speed correction value dω to the electrical angular speed ω, thus correcting the electrical angular speed ω.

Since the electrical angular speed ω is corrected corresponding to the voltage saturation variable λ in this manner, occurrence of voltage saturation can be prevented even if a sensor having a great error in the electrical angular speed ω is used as a magnetic pole position sensor 21, or even if a drive motor 31 having great speed fluctuations due to vibrations or the like is used. Therefore, an event, where the vehicle runs, a driver may feel uncomfortable, or the driving of the drive motor becomes difficult due to the occurrence of voltage saturation, can be avoided.

If there is a detection error in any one of various sensors, such as the current sensors 33, 34, the magnetic pole position sensor 21, the voltage sensor 15, etc., or if a change in an appliance constant, such as the counter electromotive voltage Mif, the inductances Ld, Lq, the resistance Ra, etc., occurs in conjunction with a temperature change, the electrical angular speed ω is also corrected corresponding to the voltage saturation variable λ, so that the occurrence of voltage saturation can be prevented. Hence, an event, where the vehicle runs, a driver may feel uncomfortable, or the driving of the drive motor may become difficult due to occurrence of voltage saturation, can be avoided.

Figure 12:
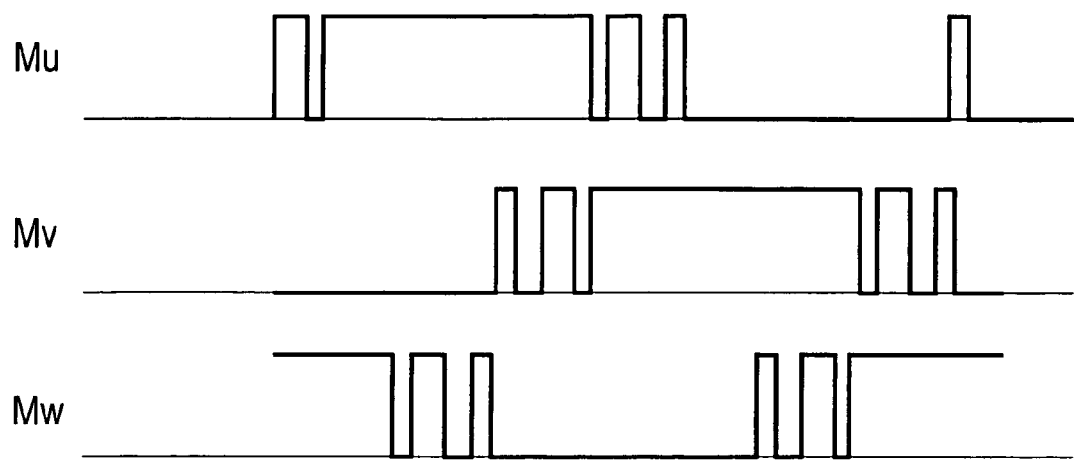
FIG. 12 is a diagram indicating waveforms of pulse width modulation signals based on the asynchronous PWM control in an embodiment of the invention.
Figure 13:
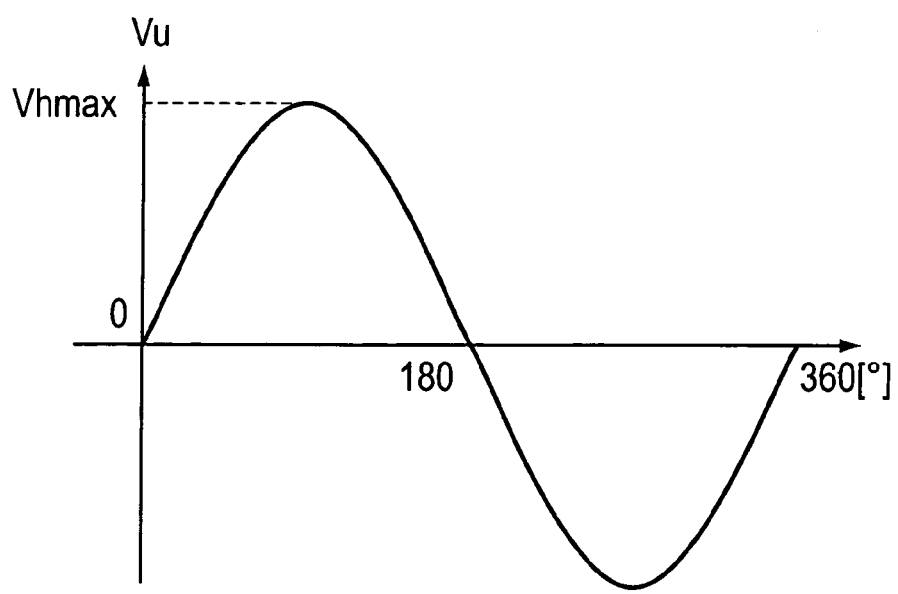
FIG. 13 is a diagram indicating a waveform of voltage of each phase based on the asynchronous PWM control in an embodiment of the invention.

In the asynchronous PWM control, the pulse width modulation signals Mu, Mv, Mw are generated as indicated in FIG. 12, and the voltages Vu, Vv, Vw of the phases (only the voltage Vu is indicated in FIG. 13) are applied to the stator coils 11 to 13.

In this case, the upper limit Vhmax of the amplitude of the voltages Vu, Vv, Vw is $$Vhmax=0.58\times Vdc$$

If the voltages Vu, Vv, Vw exceeding the upper limit are applied so as to drive the drive motor 31 in an overmodulation region, a voltage instruction value computation process executed by the voltage instruction value computing portions 78, 79 during a proportional-plus-integral calculation process cannot follow the fluctuations of the d-axis current instruction value id* and the q-axis current instruction value iq*, so that the voltage instruction values Vu*, Vv*, Vw* undergo oscillation.

In the asynchronous PWM control, the switching timing of the transistors Tr1 to Tr6 is not synchronized with the phases of the d-axis voltage instruction value vd* and the q-axis voltage instruction value vq*. Therefore, an attempt to drive the drive motor 31 in a high-rotation speed region where the drive motor 31 is rotated at high speed results in the occurrence of oscillations of the voltages Vu, Vv, Vw. Thus, a beat phenomenon occurs. Hence, in a high-rotation speed region, a sufficient drive motor torque TM cannot be generated.

That is, it is generally appropriate to execute the asynchronous PWM control in an intermediate-rotation speed region or a low-rotation speed region where the drive motor 31 is operated at an intermediate or low speed whereas it is not appropriate to execute the asynchronous PWM control in a high-rotation speed region where the drive motor 31 is operated at high speed. Therefore, the asynchronous PWM control does not provide the smooth driving of the drive motor 31 over the entire rotation speed region.

Therefore, in this embodiment, the synchronous PWM control, for example, a rectangular wave voltage control (a 1-pulse control), can be executed in addition to the asynchronous PWM control. If a predetermined switching condition is met, control is switched between the asynchronous PWM control and the rectangular wave voltage control. To that end, the electrical angular speed correction value dω is sent to the flag creating portion 32, which is a control switch determination process means of the voltage saturation avoidance process portion 25. The flag creating portion 32 executes a control switch determination process. Specifically, the flag creating portion 32 reads in the electrical angular speed correction value dω as a switch determination index for switching the control between the asynchronous PWM control and the rectangular wave voltage control, and determines whether predetermined first and second switch conditions are met on the basis of the electrical angular speed correction value dω. If the first and second switch conditions are met, the flag creating portion 32 sets a flag IP as a switch signal for switching the control. That is, the flag creating portion 32 determines that the first switch condition is met if the electrical angular speed correction value dω is equal to or greater than a threshold value dωth1. In that case, the flag creating portion 32 turns on the flag IP. If the electrical angular speed correction value dω is less than a threshold value dωth2 that is less than the threshold value dωth1, the flag creating portion 32 determines that the second switch condition is met, and turns off the flag IP. If the electrical angular speed correction value dω is less than the threshold value dωth1 but is greater than or equal to the threshold value dωth2, the flag creating portion 32 does not change the flag IP.

The voltage instruction value computing portions 78, 79 are connected to the two-phase/three-phase converting portion 67, and are also connected to the rectangular wave generator rectangular wave generator 26, which acts as a second signal generation process means and a synchronous PWM signal generation process means. When the d-axis voltage instruction value vd* and the q-axis voltage instruction value vq* are computed by the voltage instruction value computing portions 78, 79, the d-axis voltage instruction value vd* and the q-axis voltage instruction value vq* are sent to the rectangular wave generator 26 as well.

Figure 14:
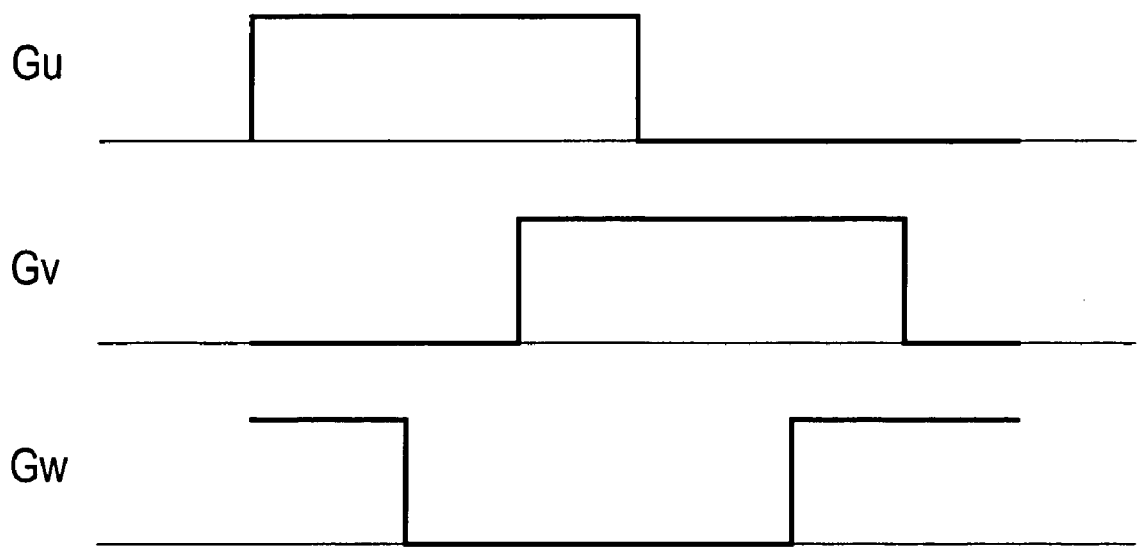
FIG. 14 is a diagram indicating waveforms of rectangular wave signals based on a rectangular wave voltage control in an embodiment of the invention.

Then, the rectangular wave generator 26 executes a second signal generation process and a synchronous PWM signal generation process. Specifically, on the basis of the d-axis current instruction value id* and the q-axis current instruction value iq*, the rectangular wave generator 26 generates rectangular wave signals Gu, Gv, Gw of the three phases as indicated in FIG. 14, as synchronous PWM signals, and sends the rectangular wave signals Gu, Gv, Gw to the selector 69. The rectangular wave signals Gu, Gv, Gw are generated with a pulse width of 180°, once during every period of 360° in electrical angle, and are formed by rectangular wave-shape voltages. The rectangular wave signals Gu, Gv, Gw form second drive signals.

The selector 69 executes a control switch process and a signal output process. Specifically, the selector 69 reads in the control switch-purpose flag IP sent from the voltage saturation avoidance process portion 25. In accordance with the on or off-state of the flag IP, the selector 69 selects one of the set of pulse width modulation signals Mu, Mv, Mw or the set of rectangular wave signals Gu, Gv, Gw, and outputs the selected set of signals by sending the signals to the drive circuit 51. In this manner, the selector 69 switches the control between the asynchronous PWM control and the rectangular wave voltage control.

In this embodiment, if the flag IP is on, the selector 69 outputs the rectangular wave signals Gu, Gv, Gw, and thus switches the control from the asynchronous PWM control to the rectangular wave voltage control. If the flag IP is off, the selector 69 outputs the pulse width modulation signals Mu, Mv, Mw, and thus switches the control from the rectangular wave voltage control to the asynchronous PWM control.

When the rectangular wave signals Gu, Gv, Gw are sent to the drive circuit 51 during the rectangular wave voltage control, the drive circuit 51 generates six gate signals in response to the rectangular wave signals Gu, Gv, Gw of the three phases, and sends the gate signals to the inverter 40. On the basis of the rectangular wave signals Gu, Gv, Gw, the inverter 40 switches (on and off) the transistors Tr1 to Tr6 at a predetermined carrier period so as to generate the currents Iu, Iv, Iw of the three phases. Then, the inverter 40 supplies the current Iu, Iv, Iw of the three phases to the stator coils 11 to 13 of the drive motor 31.

Figure 15:
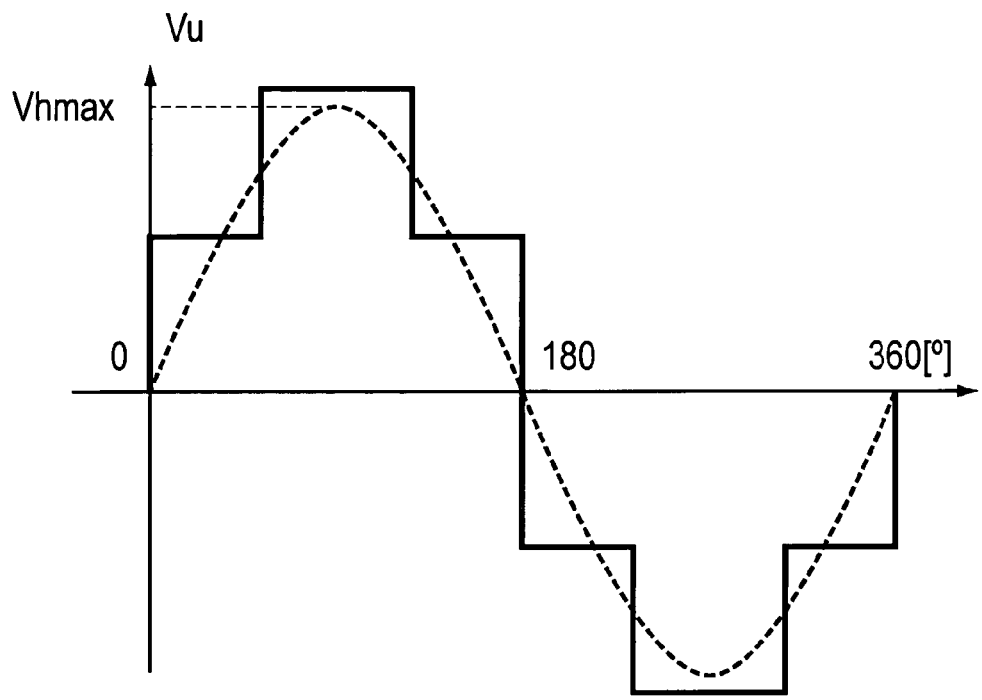
FIG. 15 is a diagram indicating a waveform of voltage of each phase based on the rectangular wave voltage control in an embodiment of the invention.

In this case, as the rectangular wave signals Gu, Gv, Gw of the three phases are output, the voltages Vu, Vv, Vw of the three phases are applied to the stator coils 11 to 13 as indicated by a solid line in FIG. 15 (only the voltage Vu is indicated in FIG. 15). The upper limit Vhmax of the amplitude of a basic wave component of each one of the voltages Vu, Vv, Vw (indicated by a broken line in FIG. 15) is:

$$Vh\max = 0.64 \times Vdc$$

In the rectangular wave voltage control, the timing of switching by the transistors Tr1 to Tr6 is synchronous with the phases of the d-axis voltage instruction value vd* and the q-axis voltage instruction value vq*. Therefore, even if the drive motor 31 is driven in a high speed region, oscillation does not occur in the voltages Vu, Vv, Vw, and a beat phenomenon does not appear.

During the rectangular wave voltage control, the rectangular wave signals Gu, Gv, Gw are constant, so that the upper limit Vhmax of the basic wave component cannot be changed. Therefore, if during the rectangular wave voltage control, an attempt is made to drive the drive motor 31 in an intermediate-rotation speed region or a low-rotation speed region, the d-axis voltage instruction value vd* and the q-axis voltage instruction value vq* become excessively high and the driving efficiency of the drive motor 31 becomes low. Thus, the rectangular wave voltage control is suitable to drive the drive motor 31 in a high-rotation speed region.

Figure 16:
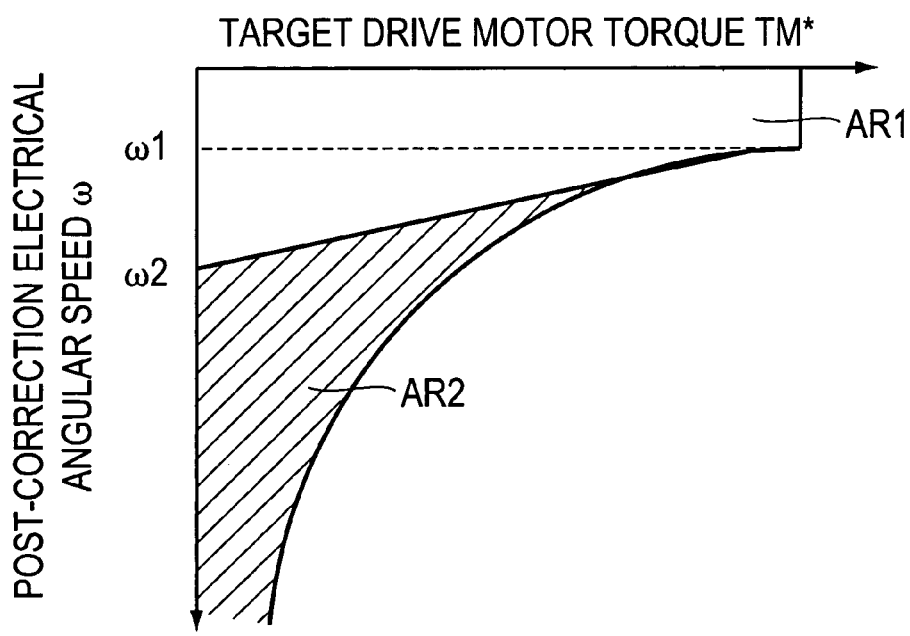
FIG. 16 is a diagram indicating control regions in an electric current instruction value map in an embodiment of the invention.
Figure 17:
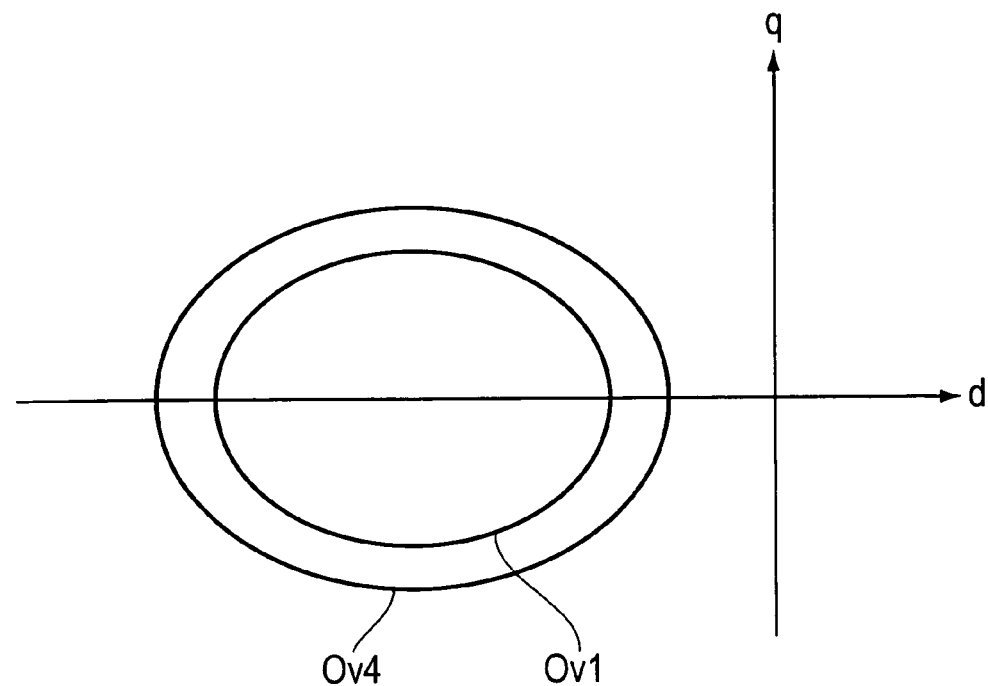
FIG. 17 is a graph indicating voltage restriction ellipses of the asynchronous PWM control and the rectangular wave voltage control in an embodiment of the invention.

If control regions AR1, AR2 are set in an electric current instruction value map as indicated in FIG. 16 and the electrical angular speed correction value dω is less than the threshold dωdth2, the flag IP is turned off, so that the asynchronous PWM control is executed in the control region AR1, and the d-axis current instruction value id* and the q-axis current instruction value iq* corresponding to the post-correction electrical angular speed ω (value ω+dω) and the target drive motor torque TM* are read from the electric current instruction value map. If the electrical angular speed correction value dω is greater than or equal to the threshold dωdth1, the flag IP is turned on, so that the rectangular wave voltage control is executed in the control region AR2, and the d-axis current instruction value id* and the q-axis current instruction value iq* corresponding to the post-correction electrical angular speed ω and the target drive motor torque TM* are read from the electric current instruction value map. To that end, the voltage restriction ellipse Ov1 for the asynchronous PWM control and a voltage restriction ellipse Ov4 for the rectangular wave voltage control are set as indicated in FIG. 17. The d-axis current instruction values id* and the q-axis current instruction values iq* that are on the voltage restriction ellipse Ov1 and are radially inward of the voltage restriction ellipse Ov1 are set in the control region AR1. The d-axis current instruction values id* and the q-axis current instruction values iq* that are on the voltage restriction ellipse Ov4 are set in the control region AR2.

Incidentally, in the control region AR1, the upper limit value of the target drive motor torque TM* is a fixed value if the post-correction electrical angular speed ω is less than a value ω1. If the post-correction electrical angular speed ω becomes equal to or greater than the value ω1, the upper limit value of the target drive motor torque TM* becomes smaller. If the post-correction electrical angular speed ω becomes equal to a value ω2, the upper limit value of the target drive motor torque TM* becomes equal to 0 [Nm].

In the control region AR2, if the post-correction electrical angular speed ω is greater than or equal to the value ω1, the d-axis current instruction values id* and the q-axis current instruction values iq* that are achievable by the rectangular wave voltage control are added to the electric current instruction value map. As the post-correction electrical angular speed ω increases, the upper limit value of the target drive motor torque TM* is reduced in the fashion of a quadratic curve.

Therefore, during execution of the asynchronous PWM control in the control region AR1, the d-axis current instruction values id* and the q-axis current instruction values iq* corresponding to the target drive motor torque TM* and the post-correction electrical angular speed ω which are on the voltage restriction ellipse Ov1 and are radially inward of the voltage restriction ellipse Ov1 are read out. At this time, the electrical angular speed correction value dω becomes substantially equal to 0. Then, as the target drive motor torque TM* increases, the d-axis current instruction value id* and the q-axis current instruction value iq* reach the values that cannot be achieved by the asynchronous PWM control. When the electrical angular speed correction value dω becomes greater than or equal to the threshold dωdth1, the control is switched, so that the rectangular wave voltage control is executed in the control region AR2. In the rectangular wave voltage control, the d-axis current instruction values id* and the q-axis current instruction values iq* corresponding to the target drive motor torque TM* and the post-correction electrical angular speed ω which are on the voltage restriction ellipse Ov4 are read out. Accordingly, the electrical angular speed correction value dω becomes substantially 0. Subsequently, if the target drive motor torque TM* becomes small during execution of the rectangular wave voltage control, the electrical angular speed correction value dω correspondingly reduces. If the electrical angular speed correction value dω becomes smaller than the threshold dωdth2 (negative), the control is switched, so that the asynchronous PWM control is executed in the control region AR1.

The limiter h2 in the electrical angular speed correction value computing portion 44 operates so as to prevent the integral ΣΔVom from exceeding a predetermined voltage during execution of the asynchronous PWM control. During execution of the rectangular wave voltage control, however, the limiter h2 operates so that the integral ΣΔVom becomes equal to a predetermined voltage, and therefore the electrical angular speed correction value ω can assume a negative value.

If during execution of the rectangular wave voltage control, a detection error occurs in a sensor, such as the magnetic pole position sensor 21, the voltage sensor 15, etc., or a change in temperature causes a change in an appliance constant, such as the counter electromotive voltage constant Mif, the inductances Ld, Lq, the resistance Ra, etc., the currents Iu, Iv, Iw through the stator coils 11 to 13 may change and their vectors may go out of the voltage restriction ellipse despite application of the fixed voltages Vu, Vv, Vw to the stator coils 11 to 13.

Figure 18:
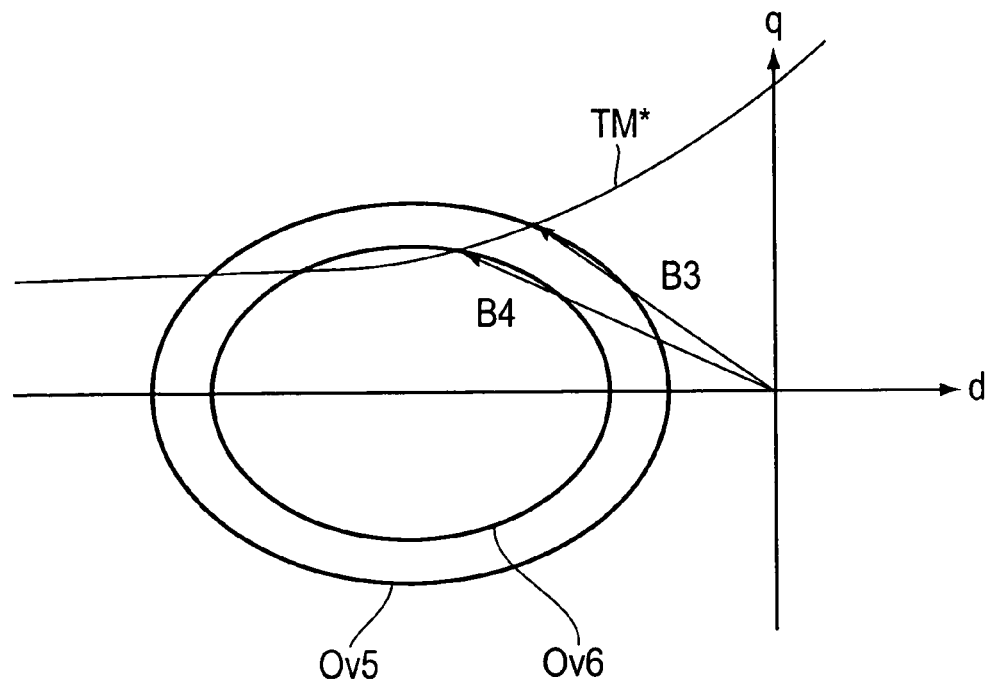
FIG. 18 is a graph illustrating a relationship between the rectangular wave voltage control and the automatic field weakening control in an embodiment of the invention.

If it is determined that the inductances Ld, Lq are relatively small and the d-axis current instruction value id* and the q-axis current instruction value iq* indicated by a vector B3 are selected as indicated in FIG. 18 while the actual inductances Ld, Lq are rather great due to a temperature change, voltage saturation will occur. In order to avoid voltage saturation in this case, it is necessary to select, for example, the d-axis current instruction value id* and the q-axis current instruction value iq* that are on an equal torque curve indicated by a predetermined target drive motor torque TM* and that are indicated by a vector B4. In FIG. 18, reference character Ov5 denotes a voltage restriction ellipse that is used in the case where it is determined that the inductances Ld, Lq are relatively small, and reference character Ov6 denotes a voltage restriction ellipse corresponding to the actual inductances Ld, Lq.

In the rectangular wave voltage control, d-axis current instruction values id* and q-axis current instruction values iq* indicated by the vector B4 can be selected only on the voltage restriction ellipse Ov6 in principle, and the d-axis current instruction values id* and the q-axis current instruction values corresponding to points that are not on the voltage restriction ellipse Ov6 cannot be selected. Therefore, if while the actual inductances Ld, Lq are relatively great, it is determined that the inductances Ld, Lq are relatively small and the d-axis current instruction value id* and the q-axis current instruction value iq* indicated by the vector B3 are selected, the voltage falls Vzdi, Vzqi corresponding to the integral term gradually increases, and the proportional-plus-integral process executed by the proportional-plus-integral process means undergoes divergence.

In that case, the apparatus of the embodiment, as described above, computes an electrical angular speed correction value dω (>0) on the basis of the voltage falls Vzdi, Vzqi, so that the d-axis current instruction value id* and the q-axis current instruction value iq* are gradually changed from the values indicated by the vector B3 to the values indicated by the vector B4. When the d-axis current instruction value id* and the q-axis current instruction value iq* reach the values indicated by the vector B4, the d-axis voltage instruction value vd* and the q-axis voltage instruction value vq* become constant, and an automatic field weakening control converges, thus substantially preventing drift or deviation of the actually generated drive motor torque TM from the target drive motor torque TM*.

Conversely, if while the actual inductances Ld, Lq are relatively small, it is determined that the inductances Ld, Lq are relatively great and the d-axis current instruction value id* and the q-axis current instruction value iq* indicated by a predetermined vector are selected, the voltage falls Vzdi, Vzqi corresponding to the integral term gradually decreases, and the proportional-plus-integral process by the proportional-plus-integral process means undergoes divergence.

In that case, the apparatus of the embodiment, as described above, computes an electrical angular speed correction value dω (<0) on the basis of the voltage falls Vzdi, Vzqi, so that the d-axis current instruction value id* and the q-axis current instruction value iq* are changed in a fashion similar to the above-described fashion. When the d-axis current instruction value id* and the q-axis current instruction value iq* reach the values indicated by an appropriate vector, the d-axis voltage instruction value vd* and the q-axis voltage instruction value vq* become constant, and the automatic field weakening control converges, thus substantially preventing drift or deviation of the actually generated drive motor torque TM from the target drive motor torque TM*.

Thus, the electrical angular speed correction value dω is computed on the basis of the voltage saturation variable λ, and the control is switched between the asynchronous PWM control and the rectangular wave voltage control on the basis of the electrical angular speed correction value dω. Therefore, even if the drive motor 31 is driven in a high-rotation speed region, oscillation does not occur in the voltages Vu, Vv, Vw, and a beat phenomenon does not appear. Furthermore, if the drive motor 31 is driven in an intermediate-rotation speed region or a low-rotation speed region, the d-axis voltage instruction value vd* and the q-axis voltage instruction value vq* do not become excessively high. Thus, the driving efficiency of the drive motor 31 can be improved. Furthermore, since drift or deviation of the actually generated drive motor torque TM from the target drive motor torque TM* can be substantially avoided, it is possible to prevent an event where as the vehicle runs, a driver may feel uncomfortable, or the driving of the drive motor becomes difficult. Therefore, the drive motor 31 can be smoothly driven.

Figure 5:
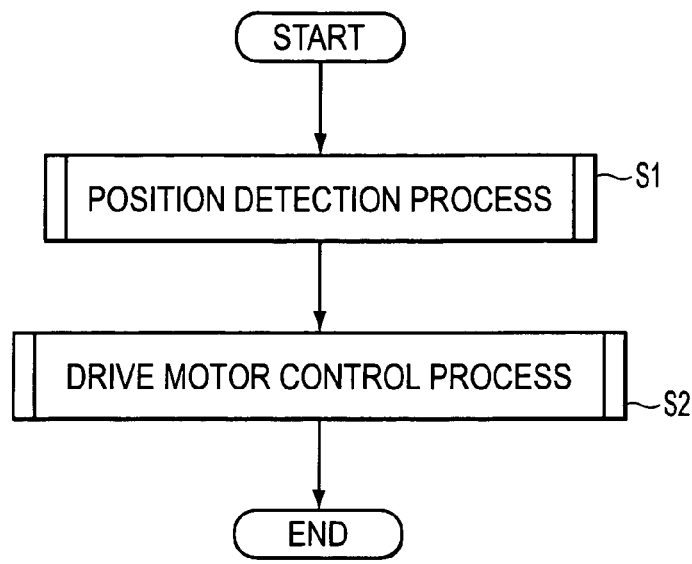
FIG. 5 is a main flowchart illustrating an operation of the electric drive control apparatus in an embodiment of the invention.

The flowchart shown in FIG. 5 will next be described. In step S1, the position detection process is executed. Subsequently in step S2, the drive motor control process is executed. After that, the process ends.

Figure 6:
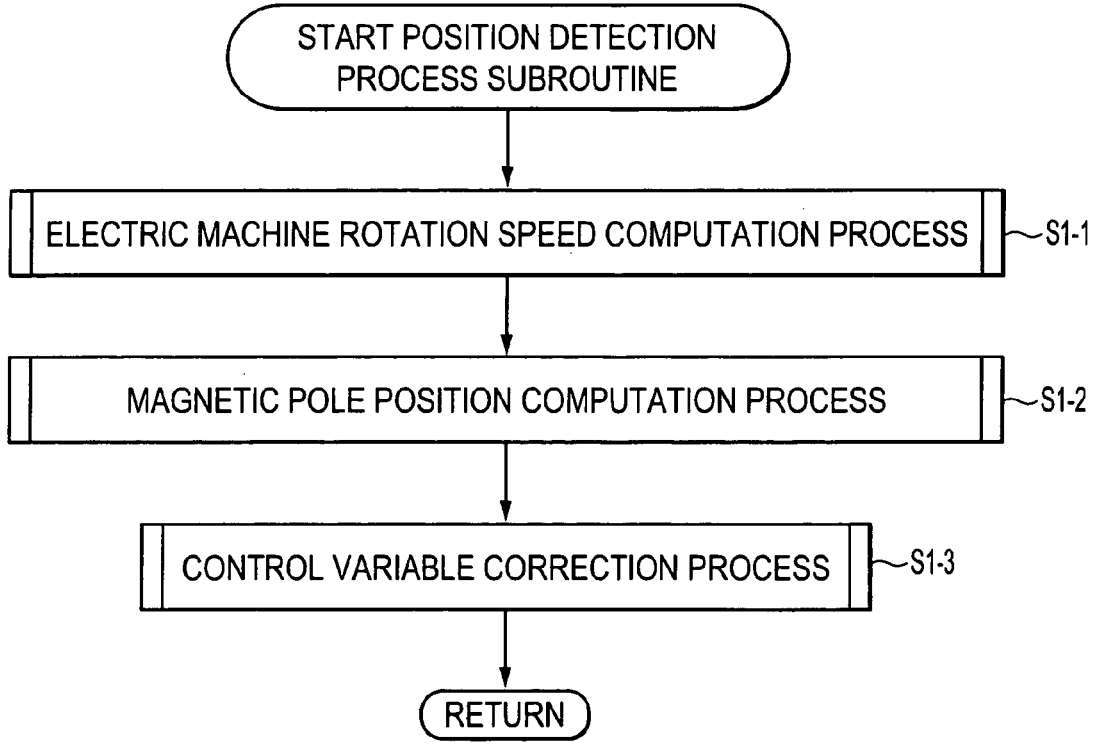
FIG. 6 is a flowchart illustrating a subroutine of a position detection process in an embodiment of the invention.

The flowchart shown in FIG. 6 will next be described. In step S1-1, the electric machine rotation speed computation process is executed. Subsequently in step S1-2, the magnetic pole position computation process is executed. Subsequently in step S1-3, the control variable correction process is executed. The process then returns.

Figure 7:
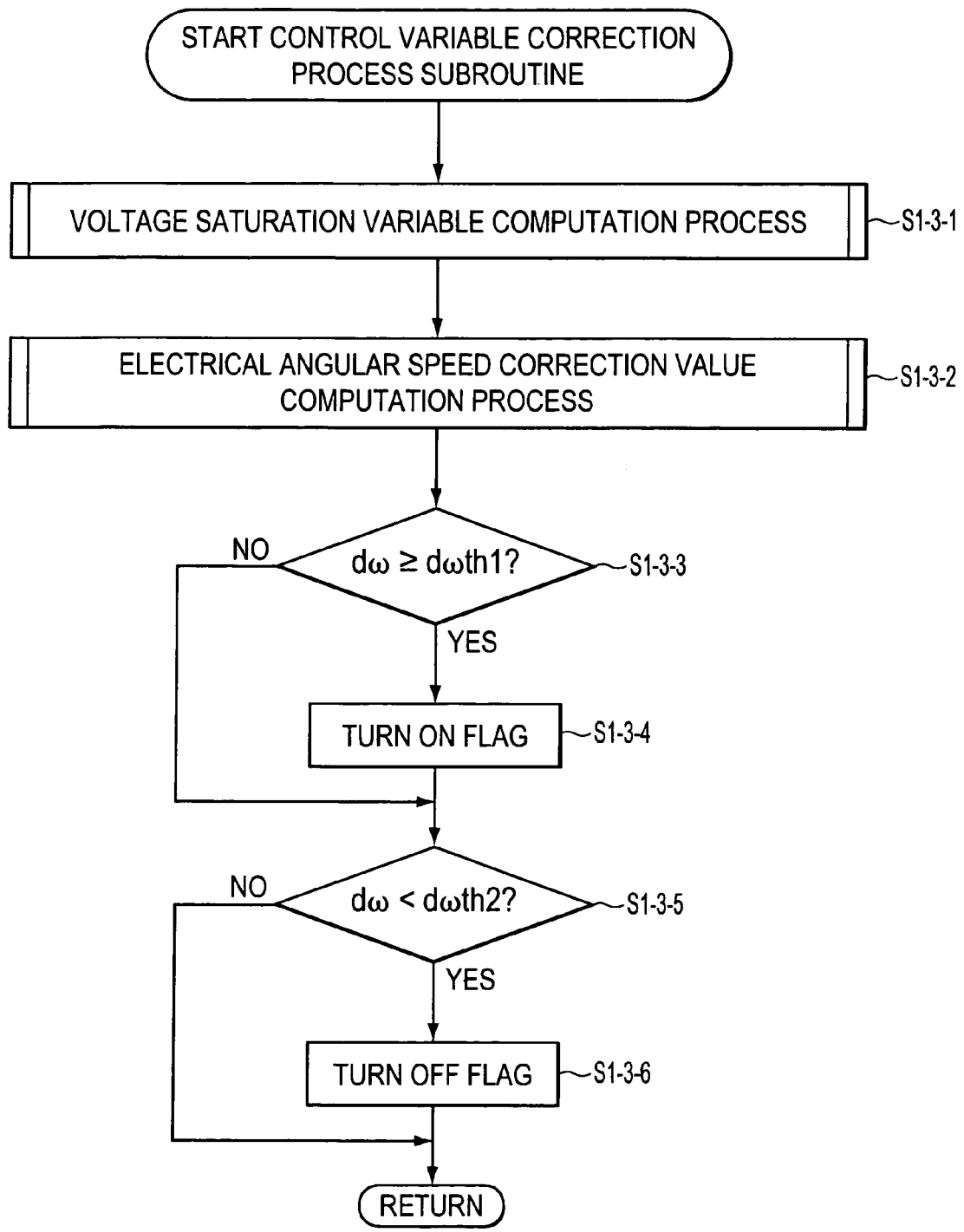
FIG. 7 is a flowchart illustrating a subroutine of a control variable correction process in an embodiment of the invention.

The flowchart shown in FIG. 7 will next be described. In step S1-3-1, the voltage saturation variable computation process is executed. Subsequently in step S1-3-2, the electrical angular speed correction value computation process is executed. Subsequently in step S1-3-3, it is determined whether the electrical angular speed correction value dω is greater than or equal to the threshold dωdth1. If the electrical angular speed correction value dω is greater than or equal to the threshold dωdth1, the process proceeds to step S1-3-4. If the electrical angular speed correction value dω is less than the threshold dωdth1, the process proceeds to step S1-3-5. In step S1-3-4, the flag IP is turned on. In step S1-3-5, it is determined whether the electrical angular speed correction value dω is less than the threshold dωdth2. If the electrical angular speed correction value dω is less than the threshold dωdth2, the process proceeds to step S1-3-6. If the electrical angular speed correction value dω is greater than or equal to the threshold dωth2, the process returns. In step S1-3-6, the flag IP is turned off. Then, the process returns.

Figure 8:
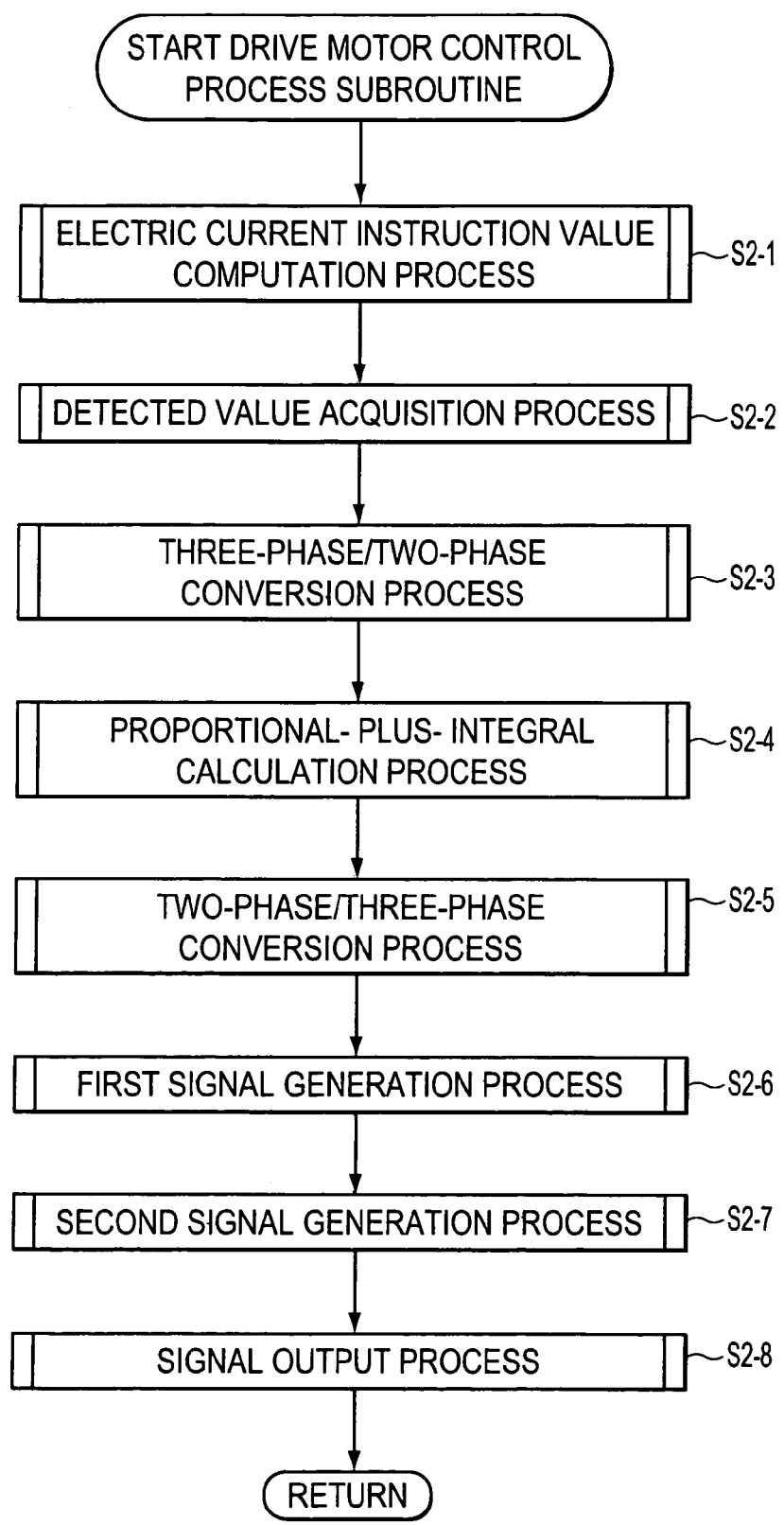
FIG. 8 is a flowchart illustrating a subroutine of a drive motor control process in an embodiment of the invention.

The flowchart shown in FIG. 8 will next be described. In step S2-1, the electric current instruction value computation process is executed. Subsequently in step S2-2, the detected current acquisition process is executed. Subsequently in step S2-3, the three-phase/two-phase conversion process is executed. In step S2-4, the proportional-plus-integral calculation process is executed. In step S2-5, the two-phase/three-phase conversion process is executed. In step S2-6, the first signal generation process is executed. In step S2-7, the second signal generation process is executed. In step S2-8, the signal output process is executed. Then, the process returns.

Figure 9:
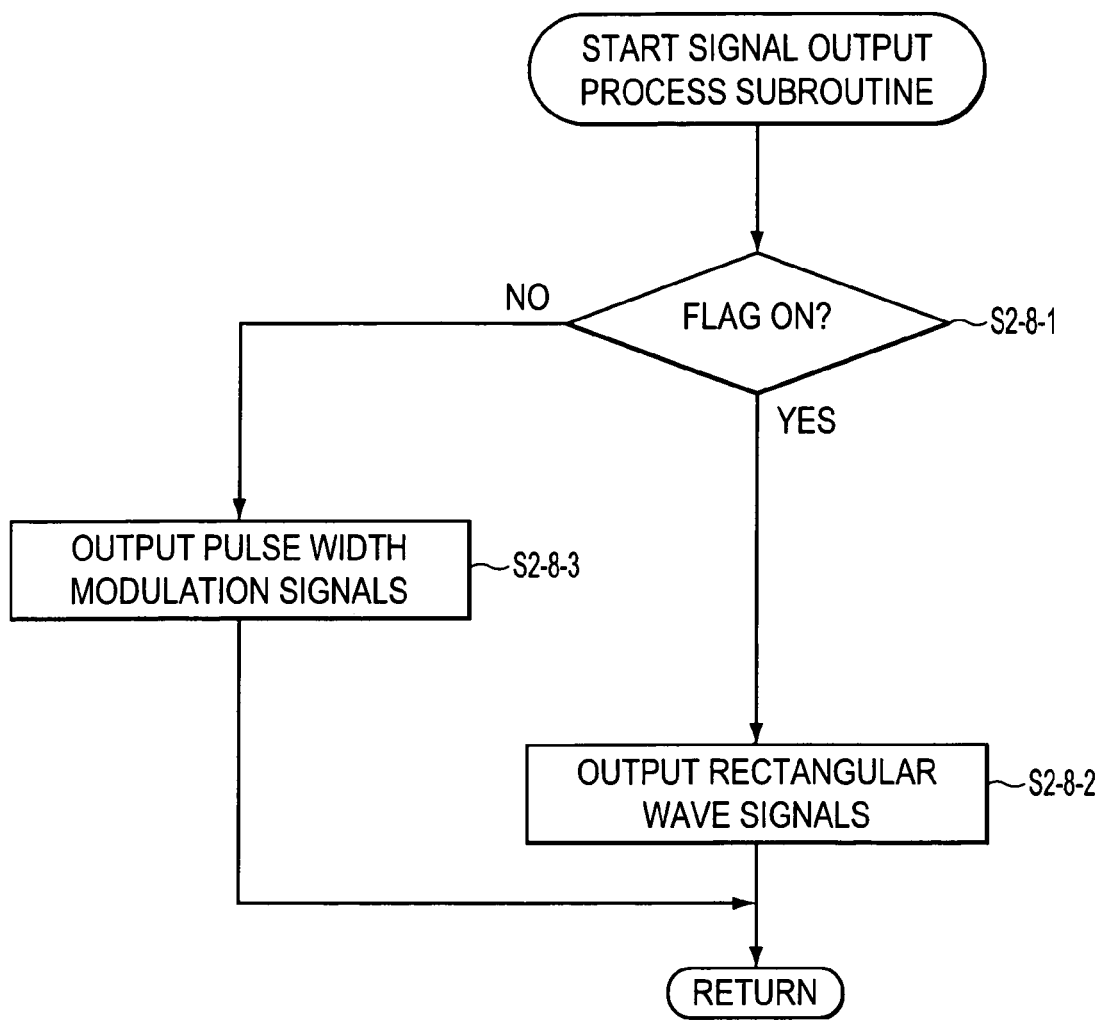
FIG. 9 is a flowchart illustrating a subroutine of a signal output process in an embodiment of the invention.

The flowchart shown in FIG. 9 will next be described. In step S2-8-1, it is determined whether the flag IP is on. If the flag IP is on, the process proceeds to step S2-8-2. If the flag IP is off, the process proceeds to step S2-8-3. In step S2-8-2, the rectangular wave signals Gu, Gv, Gw are output. Then, the process returns. In step S2-8-3, the pulse width modulation signals Mu, Mv, Mw are output. Then, the process returns.

In this embodiment, the control is switched between the asynchronous PWM control and the rectangular wave voltage control on the basis of the electrical angular speed correction value dω. The post-correction value ω+dω of the electrical angular speed ω may also be used as a basis for switching the control between the asynchronous PWM control and the rectangular wave voltage control. In that case, the flag creating portion 32 turns on the flag IP if the value ω+dω is greater than or equal to a threshold value ω+dωth, and turns off the flag IP if the value ω+dω is less than the threshold value ω+dωth.

In this embodiment, the electrical angular speed correction value dω is computed on the basis of the voltage saturation variable λ. A magnetic pole position correction value dθ representing a correction value of the magnetic pole position θ may be computed on the basis of the voltage saturation variable λ, and may be added to the magnetic pole position θ so as to correct the magnetic pole position θ as a control variable. In that case, the control can be switched between the asynchronous PWM control and the rectangular wave voltage control on the basis of the magnetic pole position correction value dθ. Specifically, if the magnetic pole position correction value dθ is greater than or equal to a threshold value dθth, the flag creating portion 32 turns on the flag IP. If the magnetic pole position correction value dθ is less than the threshold value dθth, the flag creating portion 32 turns off the flag IP. Furthermore, on the basis of the post-correction value θ+dθ of the magnetic pole position θ, the control may be switched between the asynchronous PWM control and the rectangular wave voltage control. In that case, the flag creating portion 32 turns on the flag IP if the value θ+dθ is greater than or equal to a threshold value θ+dθth, and turns off the flag IP if the value θ+dθ is less than the threshold value θ+dθth. Still further, the control may also be switched between the asynchronous PWM control and the rectangular wave voltage control on the basis of the DC voltage Vdc.

In this embodiment, the deviation ΔVom is used as a voltage saturation variable λ to compute the electrical angular speed correction value dω. The voltage saturation variable λ used to compute the electrical angular speed correction value dω may also be the instruction voltage Vom, the on-durations of the pulse width modulation signals Mu, Mv, Mw, etc.

If the on-durations of the pulse width modulation signals Mu, Mv, Mw are used as a voltage saturation variable λ, the voltage saturation variable computing portion executes a voltage saturation variable computation process as follows. The computing portion reads in the on-durations Tu, Tv, Tw of the pulse width modulation signals Mu, Mv, Mw as variables that are not affected by noises that occur in conjunction with the occurrence of the error θe in the magnetic pole position θ, and computes a voltage saturation variable on the basis of the on-durations Tu, Tv, Tw. Then, the electrical angular speed correction value computing portion executes an electrical angular speed correction value computation process. Specifically, the computing portion executes an integral calculation on the basis of the voltage saturation variable λ so as to compute the electrical angular speed correction value dω for correcting the electrical angular speed ω.

To that end, a selector that acts as a selection means in the voltage saturation variable computing portion executes a selection process. Specifically, the selector reads in the on-durations Tu, Tv, Tw at a predetermined sampling period T, and selects a maximum on-duration Tmax among the on-durations Tu, Tv, Tw. Furthermore, the instruction voltage restriction value creating portion sets a value close to the on-duration Tfon that is the on-duration of the pulse width modulation signals Mu, Mv, Mw in the full-on state, as an on-duration restriction value T* that represents a target value. Using a subtracter, the creating portion computes a deviation ΔT between the on-duration restriction value T* and the on-duration Tmax as a voltage saturation variable λ.

$$\Delta T = T\mathrm{max} - T^*$$

After the voltage saturation variable λ is computed in this manner, the electrical angular speed correction value dω is computed by the electrical angular speed correction value computing portion.

In this embodiment, the deviation ΔVom is used as the voltage saturation variable λ. The deviation ΔVom can be computed both during the asynchronous PWM control and during the rectangular wave voltage control. Therefore, both the switch from the asynchronous PWM control to the rectangular wave voltage control and the switch from the rectangular wave voltage control to the asynchronous PWM control can be carried out on the basis of the electrical angular speed correction value dω.

In contrast, if the on-durations of the pulse width modulation signals Mu, Mv, Mw are used as the voltage saturation variable λ, the pulse width modulation signals Mu, Mv, Mw are generated during the asynchronous PWM control, but are not generated during the rectangular wave voltage control. Therefore, the switch from the asynchronous PWM control to the rectangular wave voltage control is carried out on the basis of the deviation ΔT whereas the switch from the rectangular wave voltage control to the asynchronous PWM control is carried out on the basis of the electric current phase.

In the embodiment, the rectangular wave generator 26 is used as a synchronous PWM signal generation process means, and the rectangular wave signals Gu, Gv, Gw are generated as synchronous PWM signals by the rectangular wave generator 26. In another possible structure, a synchronous PWM signal generator may be used as a synchronous PWM signal generation process means to generate a 3-pulse signal, a 5-pulse signal, etc., as a synchronous PWM signal, so as to execute a 3-pulse control, a 5-pulse control, etc.

In accordance with an exemplary aspect of the invention, if the switch condition for switching the control between the asynchronous PWM control and the synchronous PWM control is met, a drive signal is selected and output so as to switch the control between the asynchronous PWM control and the synchronous PWM control. Therefore, even if the electric machine is driven in a high-rotation speed region, voltage oscillation does not occur, and a beat phenomenon does not appear. Furthermore, even if the electric machine is driven in an intermediate-rotation speed region or a low-rotation speed region, the voltage instruction value does not become excessively high, so that the driving efficiency of the electric machine can be improved. Still further, since the drift or deviation of the actually generated electric machine torque from the target electric machine torque can be prevented, it is possible to prevent an event where as an electric vehicle or the like equipped with the electric machine runs, a driver may feel uncomfortable, or the driving of the electric machine becomes difficult. Therefore, the electric machine can be smoothly driven.

It is to be understood that the invention is not limited to the foregoing embodiments, but may be changed or modified in various manners based on the gist of the present invention, and that such changes or modifications are not excluded from the scope of the invention.

What is claimed is:

1. An electric drive control apparatus for an electric machine, comprising:
   a controller that:
      computes an instruction value based on an electric machine rotational speed and a target electric machine torque that represents a target value of an electric machine torque;
      generates a drive signal based on the instruction value;
      computes a voltage saturation variable that represents a likelihood of an occurrence of a voltage saturation;
      determines whether a switch condition for switching a control between an asynchronous PWM control and a synchronous PWM control is met based on the voltage saturation variable; and
      selects and outputs the drive signal and switches the control between the asynchronous PWM control and the synchronous PWM control based on a determination as to the switch condition.

2. The electric drive control apparatus according to claim 1, wherein the controller computes a correction value of a control variable based on the voltage saturation variable, and determines whether the switch condition is met is based on the correction value.

3. The electric drive control apparatus according to claim 2, wherein the controller computes the voltage saturation variable based on the instruction value.

4. The electric drive control apparatus according to claim 2, wherein the controller computes the voltage saturation variable based on the drive signal.

5. The electric drive control apparatus according to claim 2, wherein the correction value is an electrical angular speed correction value related to an automatic field weakening control.

6. The electric drive control apparatus according to claim 2, wherein the correction value is a magnetic pole position correction value related to an automatic field weakening control.

7. The electric drive control apparatus according to claim 2, wherein the synchronous PWM control is a rectangular wave voltage control.

8. The electric drive control apparatus according to claim 1, wherein the controller computes the voltage saturation variable based on the instruction value.

9. The electric drive control apparatus according to claim 1, wherein the controller computes the voltage saturation variable based on the drive signal.

10. The electric drive control apparatus according to claim 1, wherein the synchronous PWM control is a rectangular wave voltage control.

11. The electric drive control apparatus according to claim 1, wherein the controller computes the voltage saturation variable based on a variable that is not affected by noises.

12. An electric drive control method comprising the steps of:
- computing an instruction value based on an electric machine rotational speed and a target electric machine torque that represents a target value of an electric machine torque;
- generating a drive signal based on the instruction value;
- computing a voltage saturation variable that represents a likelihood of an occurrence of a voltage saturation;
- determining whether a switch condition for switching a control between an asynchronous PWM control and a synchronous PWM control is met based on the voltage saturation variable; and
- selecting and outputting the drive signal and switching the control between the asynchronous PWM control and the synchronous PWM control based on a result of a determination as to the switch condition.

13. The electric drive control method according to claim 12, wherein a correction value of a control variable is computed based on the voltage saturation variable, and whether the switch condition is met is determined based on the correction value.

14. The electric drive control method according to claim 13, wherein the voltage saturation variable is computed based on the instruction value.

15. The electric drive control method according to claim 13, wherein the voltage saturation variable is computed based on the drive signal.

16. The electric drive control method according to claim 13, wherein the correction value is an electrical angular speed correction value related to an automatic field weakening control.

17. The electric drive control method according to claim 13, wherein the correction value is a magnetic pole position correction value related to an automatic field weakening control.

18. The electric drive control method according to claim 13, wherein the synchronous PWM control is a rectangular wave voltage control.

19. The electric drive control method according to claim 12, wherein the voltage saturation variable is computed based on the instruction value.

20. The electric drive control method according to claim 12, wherein the voltage saturation variable is computed based on the drive signal.

21. The electric drive control method according to claim 12, wherein the synchronous PWM control is a rectangular wave voltage control.

22. The electric drive control method according to claim 12, wherein the voltage saturation variable is computed based on a variable that is not affected by noises.

23. A program of an electric drive control device, comprising:
- a routine that computes an instruction value based on an electric machine rotational speed and a target electric machine torque that represents a target value of an electric machine torque;
- a routine that generates a drive signal based on the instruction value;
- a routine that computes a voltage saturation variable that represents a likelihood of an occurrence of a voltage saturation;
- a routine that determines whether a switch condition for switching a control between an asynchronous PWM control and a synchronous PWM control is met based on the voltage saturation variable; and
- a routine that selects and outputs the drive signal and switches the control between the asynchronous PWM control and the synchronous PWM control based on a determination as to the switch condition.

24. The program of the electric drive control device according to claim 23, wherein the voltage saturation variable is computed based on a variable that is not affected by noises.

* * * * *